United States Patent [19]

Willey

[11] Patent Number: 5,841,574
[45] Date of Patent: Nov. 24, 1998

[54] MULTI-SPECIAL DECENTERED CATADIOPTRIC OPTICAL SYSTEM

[75] Inventor: Gilbert W. Willey, Arlington Heights, Ill.

[73] Assignee: Recon/Optical, Inc., Barrington, Ill.

[21] Appl. No.: 672,452

[22] Filed: Jun. 28, 1996

[51] Int. Cl.$^6$ .......................... G02B 17/08; G02B 13/14; G02B 23/04; G02B 23/06
[52] U.S. Cl. .......................... 359/351; 356/366; 356/729; 396/322
[58] Field of Search ........................... 359/351, 355, 359/366, 365, 364, 858, 859, 727, 728, 729, 731, 634; 250/578.1; 396/322, 327

[56] References Cited

U.S. PATENT DOCUMENTS

| | | |
|---|---|---|
| 1,578,899 | 3/1926 | Lohmann . |
| 3,580,679 | 5/1971 | Perkin ..................................... 359/727 |
| 3,674,334 | 7/1972 | Offner . |
| 4,226,501 | 10/1980 | Shafer . |
| 4,265,510 | 5/1981 | Cook . |
| 4,666,254 | 5/1987 | Iizuka . |

OTHER PUBLICATIONS

Rubin Gelles, *Unobsucred–aperature two–mirror systems*, Journal of the Optical Society of America, vol. 65 No. 1 (Oct., 1975) pp. 1141–1143.

Rubin Gelles, *Unobscured Aperature Stigmatic Telescopes*, Optical Engineering, vol. 13 No. 6 (Nov./Dec. 1974) pp. 534–538.

Edward L. O'Neill, *Transfer Function for Annular Aperature*, Journal of the Optical Society of America, vol. 46 No. 4 (Apr., 1956) pp. 285–288.

*Primary Examiner*—Jon W. Henry
*Attorney, Agent, or Firm*—McDonnell Boehnen Hulbert & Berghoff

[57] ABSTRACT

A multi-spectral decentered catadioptric-type optical system suitable for use with long range oblique aerial reconnaissance camera systems, spectrum analyzers, astronomical imagers, remote sensing, and other applications is described. The optical system includes an aspheric primary mirror receiving incident radiation and defining a central aperture. An aspheric secondary mirror is provided for receiving the radiation from the primary mirror. The primary and secondary mirrors are positioned and constructed such that entrance aperture of the system is displaced or decentered relative to the optical axis of the system, so as to thereby increase the modulation transfer function of the optical system as compared to a centrally obscured system.

The aspheric secondary mirror directs the incident radiation onto a means for splitting the radiation to a first optical path and a second optical path. A first field optical assembly is placed in the first optical path for directing radiation in a first portion of the electromagnetic spectrum onto a first radiation receiving device, such as a film camera or electro-optical detector. A second field optical assembly is placed in the second optical path for directing radiation in a second portion of the electromagnetic spectrum, for example, wavelengths in the infrared portion of the spectrum, onto a second radiation receiving device, such as an electro-optical detector.

The optical system permits dual spectrum imaging by the first and second detectors of both visible and infrared portions of the spectrum, while providing improved modulation transfer functions for both portions of the spectrum. Further, the optical system is especially suitable for applications requiring a long focal length of the optical system and a wide field of view, such as long range aerial reconnaissance camera systems and astronomical imagers.

37 Claims, 30 Drawing Sheets

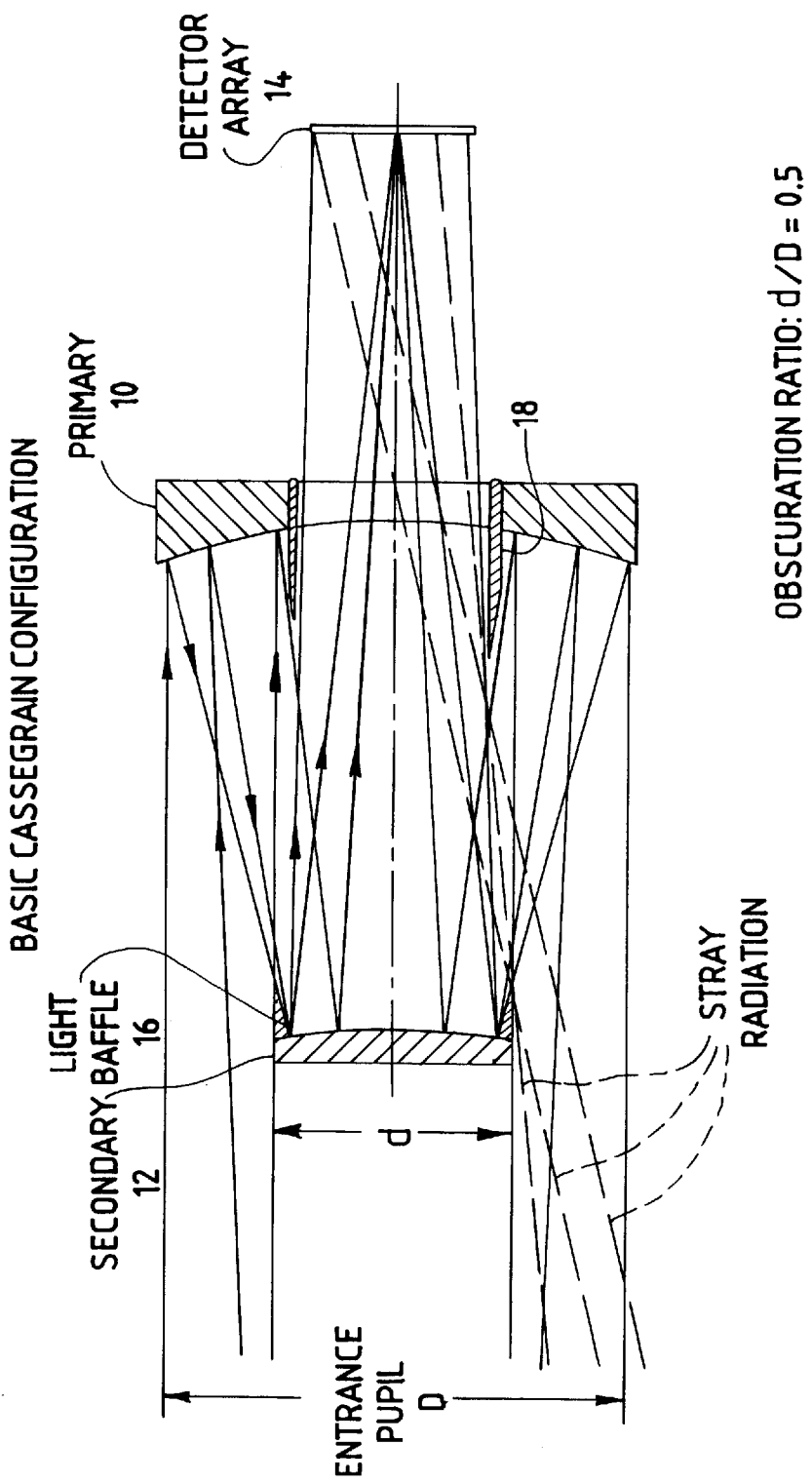

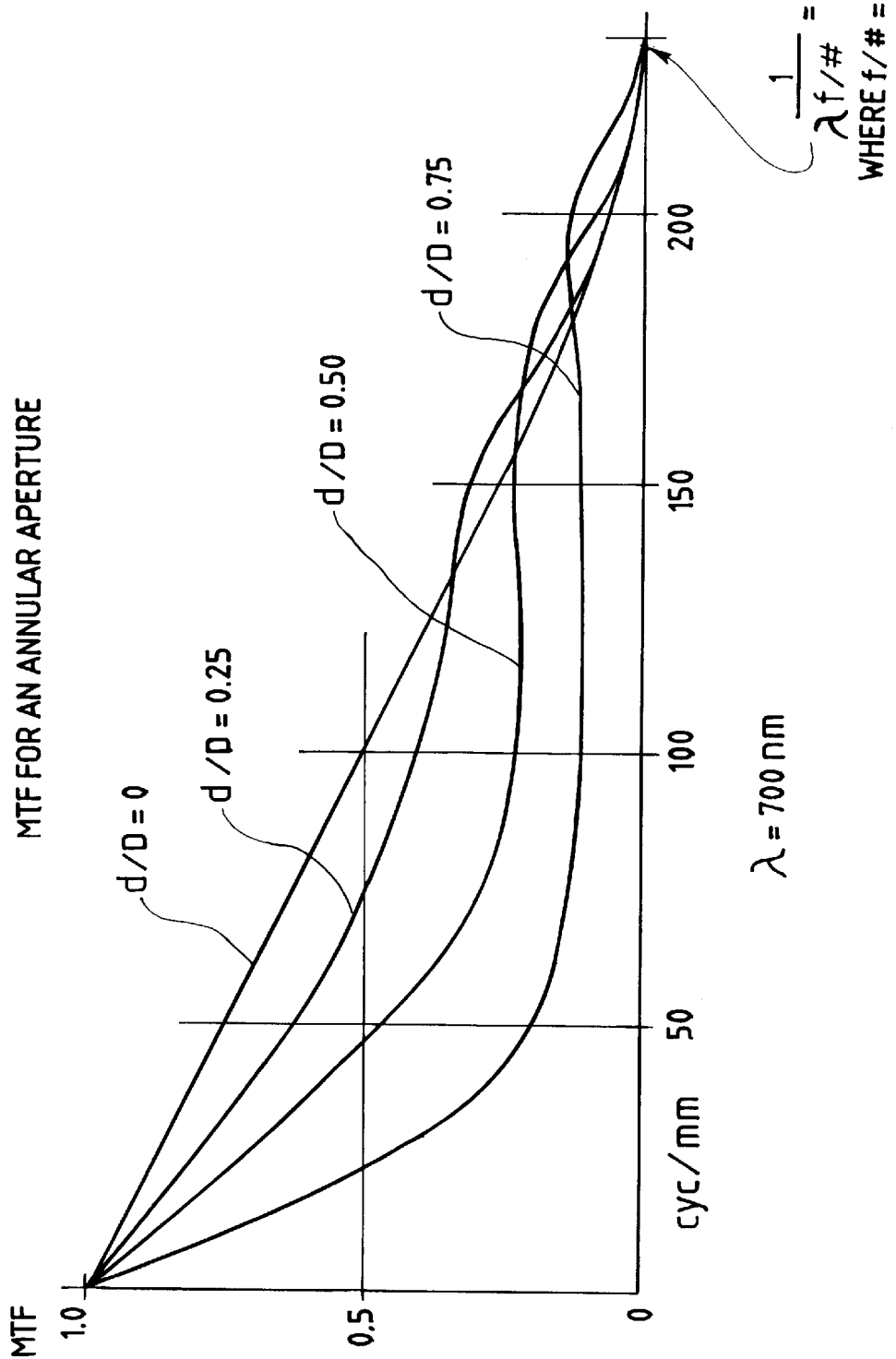

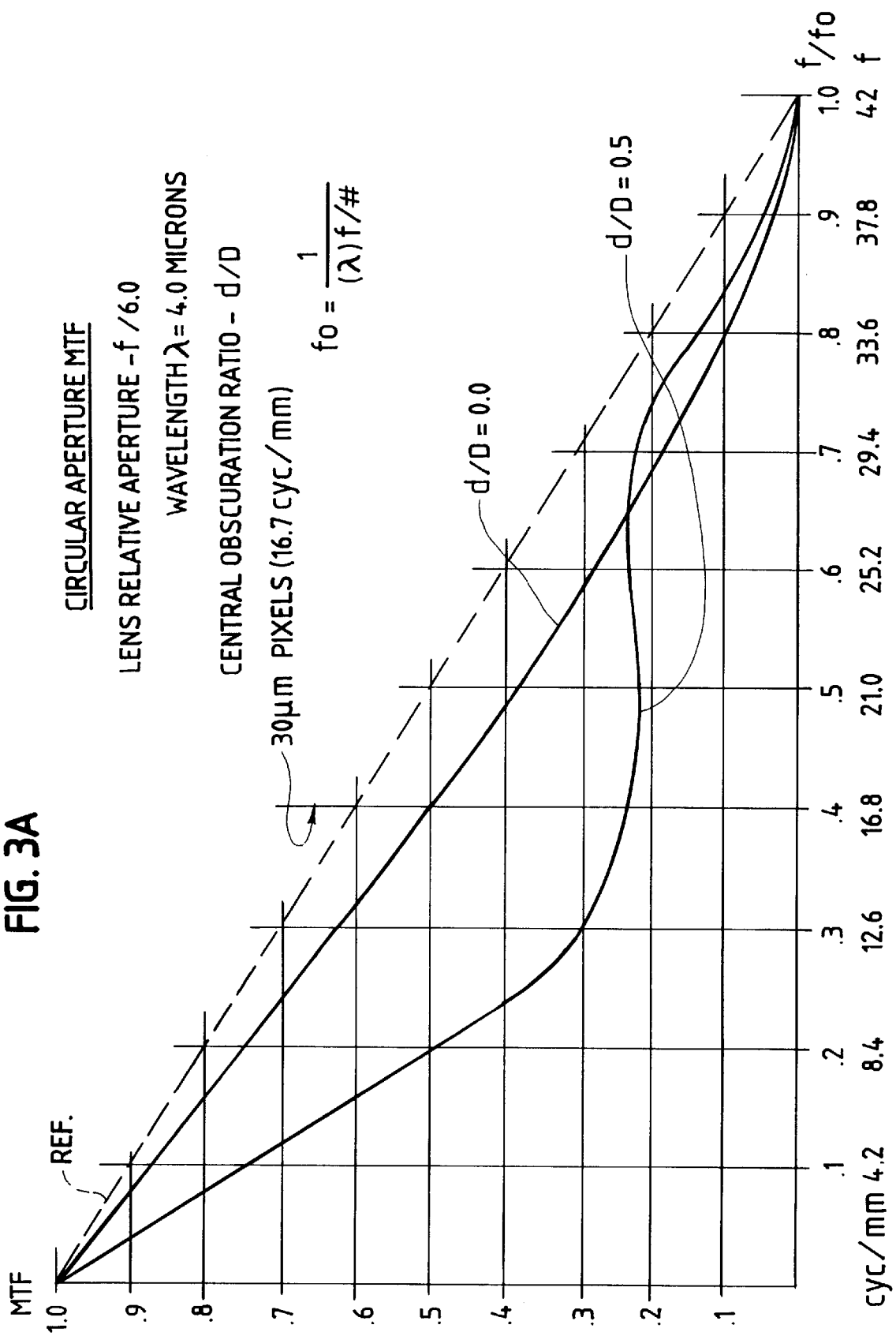

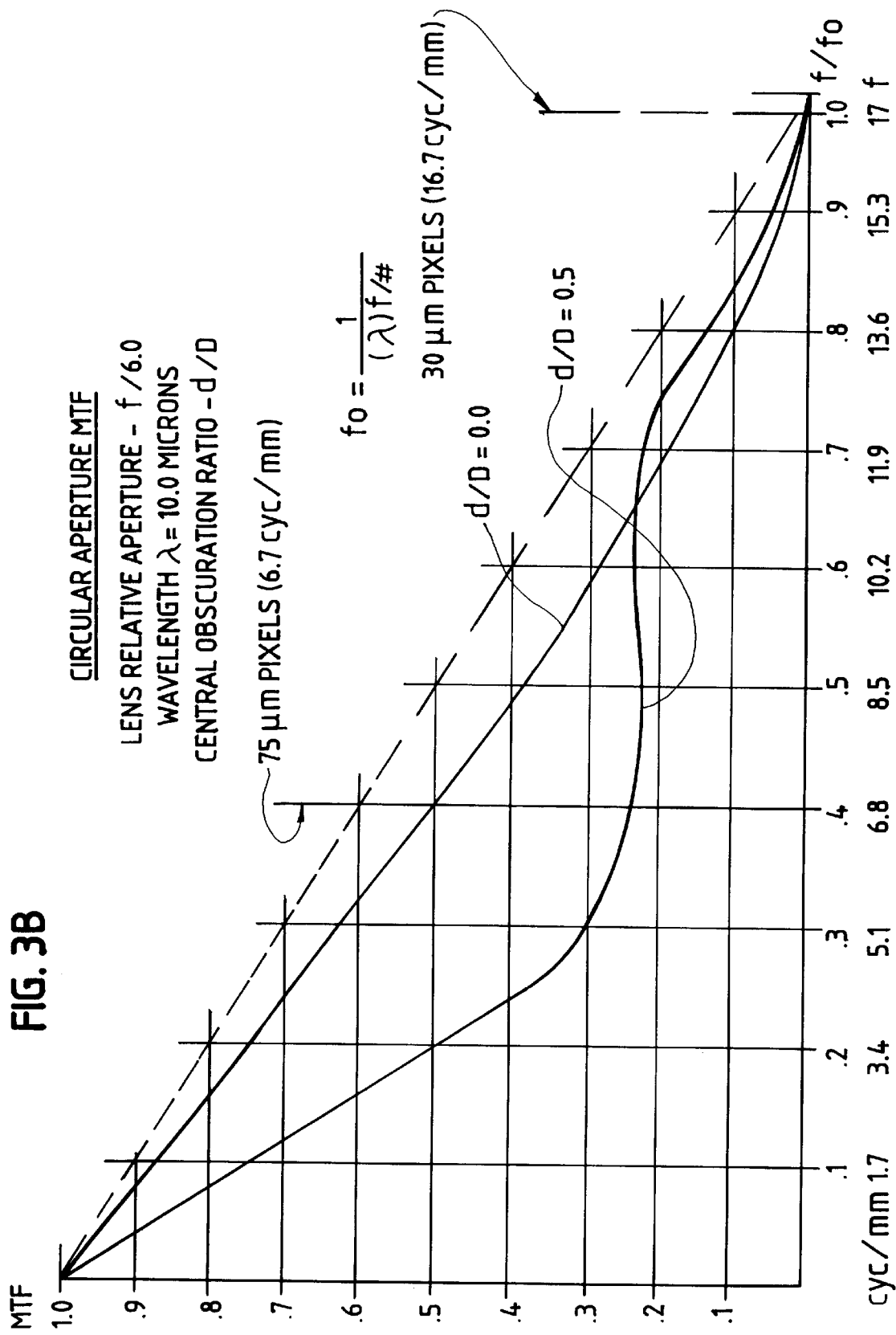

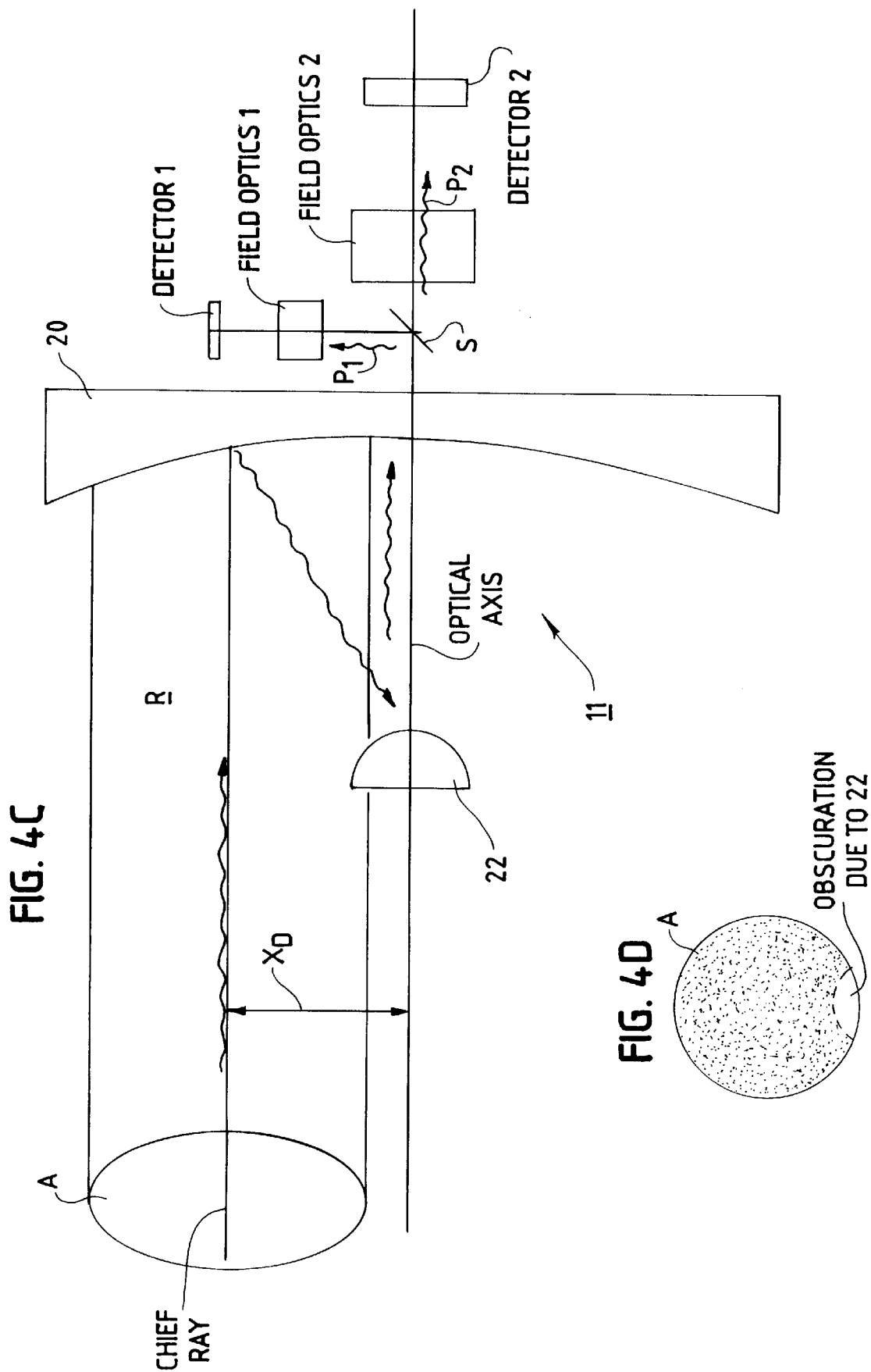

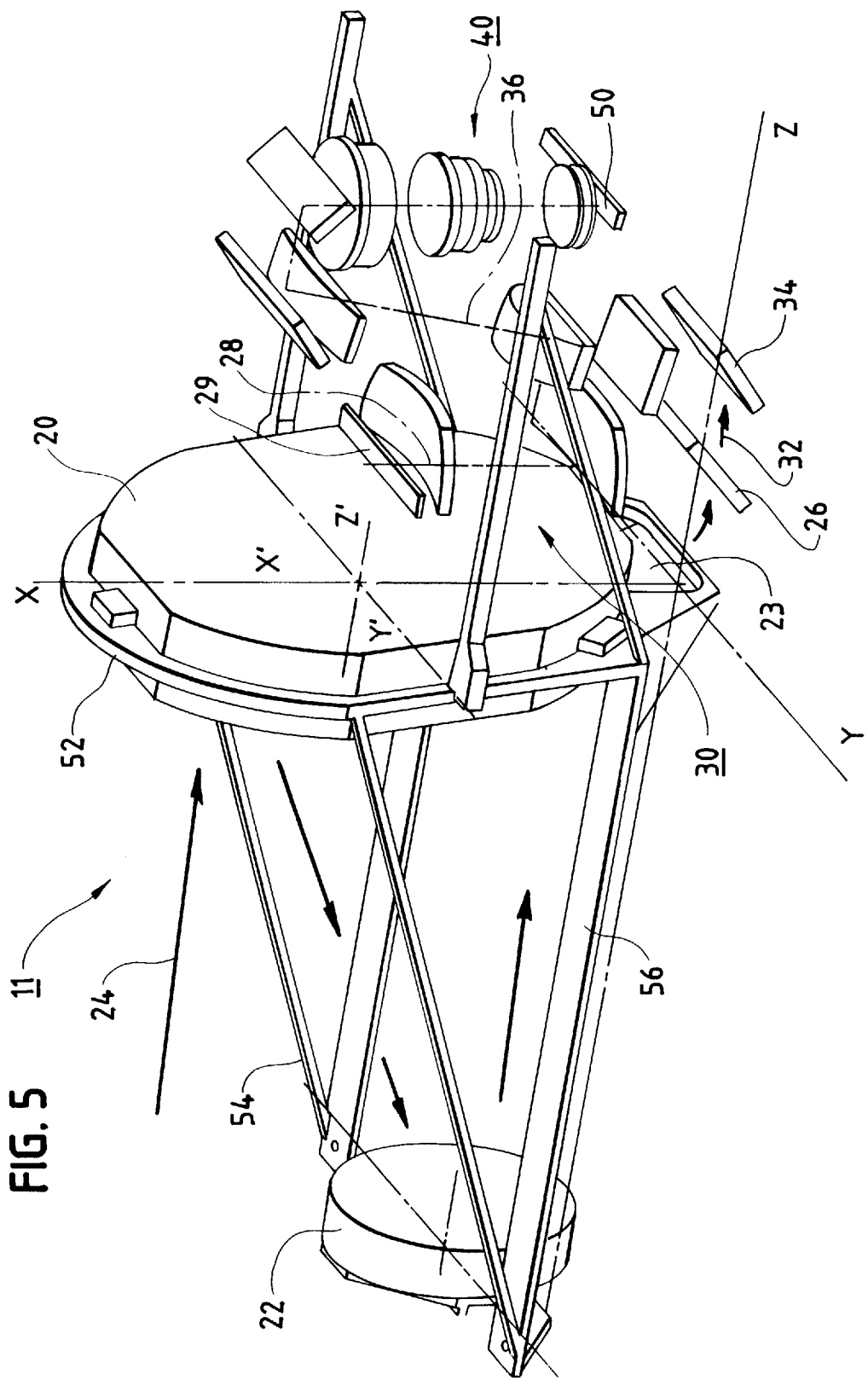

72" F/5 VIS. PATH 3.76 DEG. FOV - YZ

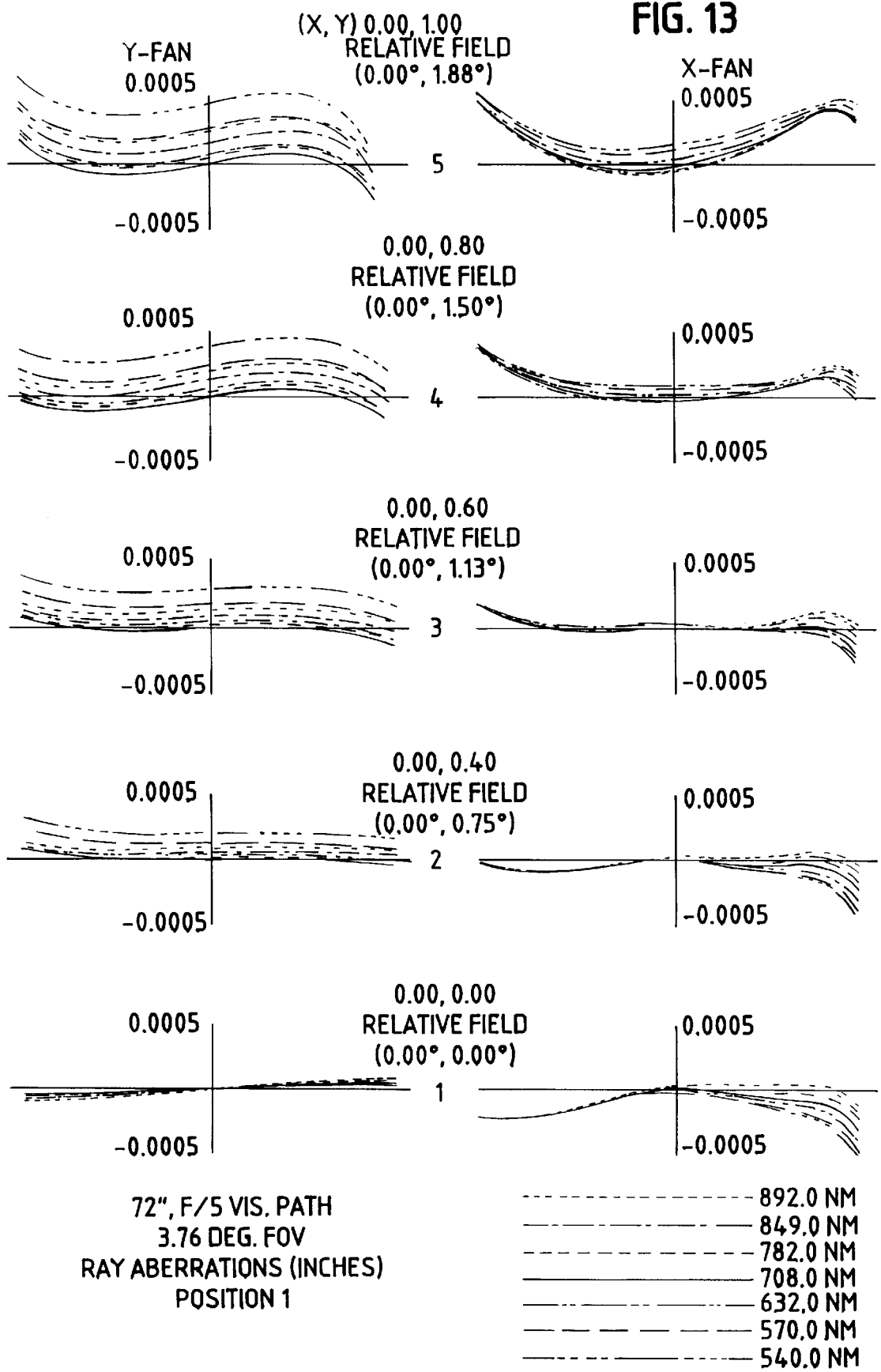

72", F/5 EO PATH

72", F/5 DUAL SPEC MWIR PATH YZ PLANE

ASTIGMATIC FIELD CURVES

LONGITUDINAL SPHERICAL ABER.

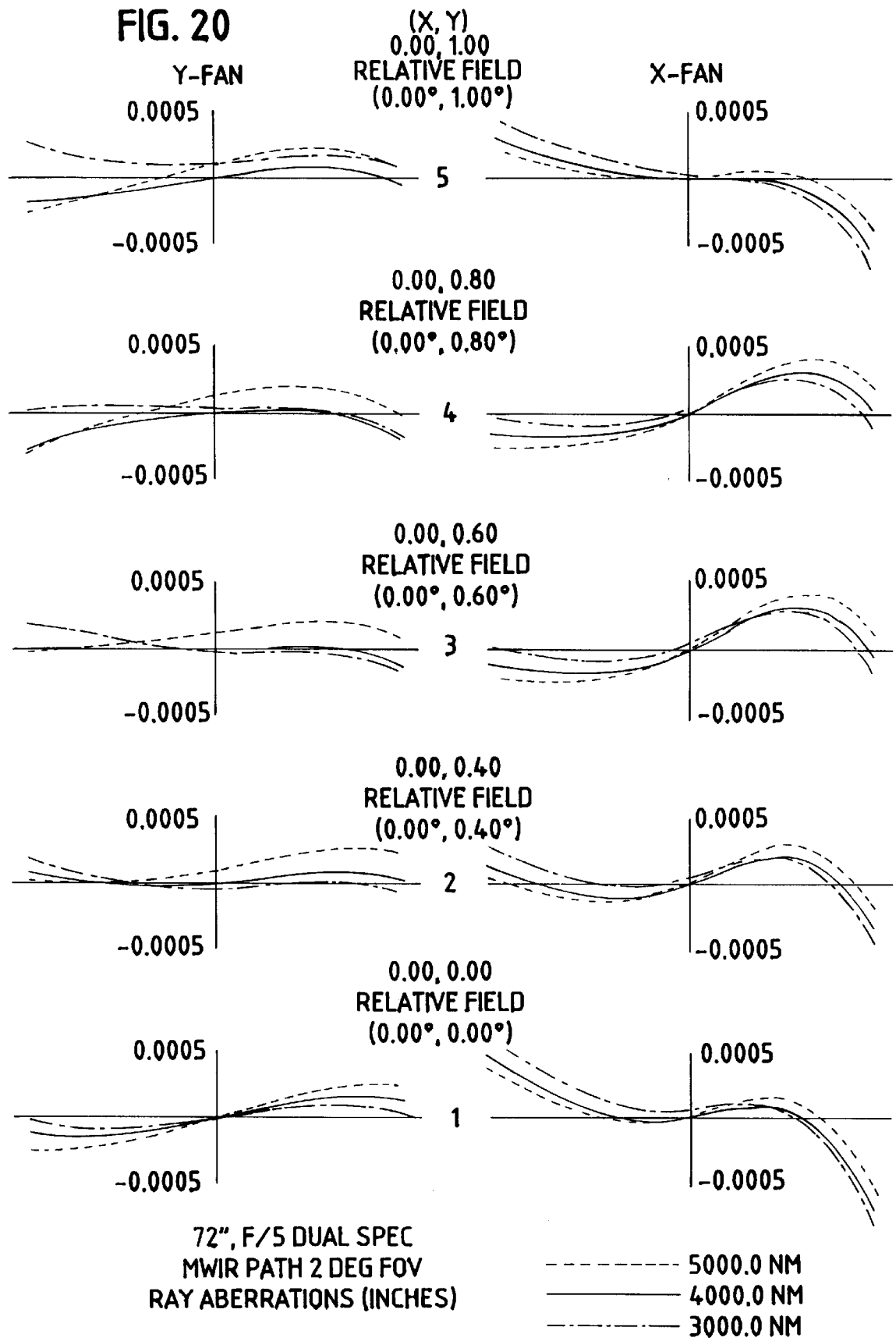

72", F/5 DUAL SPEC MWIR PATH 2 DEG FOV

MULTI-SPECIAL DECENTERED CATADIOPTRIC OPTICAL SYSTEM

BACKGROUND OF THE INVENTION

A. Field of the Invention

This invention relates to decentered aperture catadioptric optical systems, where the central portion of the primary mirror aperture is unobscured or partially obscured. In one aspect of the invention, such an optical system may be used in long range multispectral aerial reconnaissance photography, in which a linear sensor array or exposure slit is used to scan an image of the scene in a first portion of the electromagnetic spectrum, such as the visible or near infrared. The optical system may also be employed in conjunction with a second sensor that images in a second portion of the electromagnetic spectrum, such as the mid- and long wavelength infrared.

The multi-spectral decentered aperture catadioptric optical system of the present invention is capable of additional applications besides aerial reconnaissance camera systems. Other possibilities include spectroscopy and astronomy applications, as well as imaging, photography, remote sensing and spectroscopy applications performed from satellites or spacecraft orbiting the Earth.

B. Background Art, Improvements and Advantages of The Invention

Users of airborne Long Range Oblique Photography (LOROP) sensors are expressing a desire to upgrade visible spectrum film and electro-optic (E-O) LOROP camera systems to include operation in the thermal infrared (IR) wavelengths as well. The camera system typically will image terrain in radiation that falls in two or more discrete portions of the electromagnetic spectrum (i.e., "dual-spectrum" or "multi-spectral" operation). Typically, the spectra are as follows:

Spectrum #1 is visible/near infrared (IR) $\lambda$=about 0.5 to about 1.0 microns Spectrum #2 is mid-wavelength IR $\lambda$=about 3.0 to about 5.0 microns Spectrum #3 is long-wavelength IR $\lambda$=about 8.0 to about 14.0 microns Ideally, the camera optical system should be designed for dual spectrum LOROP operation, with spectrum selection available at any time while the camera is airborne. The "dual spectrum" operation requirement practically dictates that the optical system be some form of reflective (catoptric) optics or catadioptric (combination of reflective and refractive) optics.

The basic configuration of the classical Cassegrain reflective optical system is shown in FIG. 1, which shows the fundamental geometric relationships between the primary 10 and secondary 12 reflectors and a focal plane detector array 14. Field optics (not shown) may be used to correct off-axis aberrations and would be positioned just in front of the detector. Some of the basic "limiting" rays are shown (solid rays) along with three unwanted or stray—unfocussed rays (shown as dashed rays). The configuration shown in FIG. 1 has a central obscuration ratio (d/D) of 50% due to the presence the secondary reflector 12 in the incident light path, where d is the diameter of the obscuration resulting from the secondary mirror or reflector 12 and D is the diameter of the entrance pupil of the primary mirror 10 at a 0 degree field of view. This ratio can be both smaller and larger than 50%, depending on the relative size of the primary and secondary optical elements.

The inclusion of thermal infrared spectrum operation in a LOROP camera system sounds simple enough, but there are some fundamental principles of physics that must be taken into consideration. By its very nature, LOROP implies a long focal length lens system, with the focal length typically in the range of 5 to 10 feet (roughly 1.5 to 3 meters). Additionally, many practical aircraft space and window limitations drive the sensor aperture size to 12 inches (30 cm) or less. This sets a range of f/numbers (i.e., the ratio of focal length/aperture or lens diameter) from f/5 to f/10, and in some cases even slower than f/10.

One of the fundamental laws of optical physics is that the limiting resolution is a function of f/# and wavelength $\lambda$. The relationship is $$f_o = \frac{1}{\lambda f/\#}$$

where $f_o$ is the limiting spatial frequency—cyc/mm $\lambda$ is the central wavelength in mm, and f/# is the lens relative aperture A commonly used measure of optical performance for the lenses discussed herein is MTF (modulation transfer function), which is plotted as a function of spatial frequency (f) for circular shaped aperture lenses in FIGS. 2, 3A and 3B. Lens MTF is a relative measure of the sensor response and image quality for incident radiation, with 1.0 being optimal or maximum response. Spatial frequency is a measure of the number of cycles of dark bars and light bars in the space of 1 mm at the plane of the sensor. An f/# of f/6 has been selected as "typical" for LOROP systems. This would correspond to a typical sensor having a focal length of 72 inches and an aperture of 12 inches.

The MTF for an optical system having an annular shaped aperture has been described in O'Neil, Edward L., *Transfer Functions for an Annular Aperture*, Journal of the Optical Society of America, Vol. 46, no. 4, pp. 285–288 April 1956, and is shown in FIG. 2 for an f/6.0 circular aperture lens with relative obscuration ratios (d/D) of 0, 0.25, 0.50 and 0.75 at a wavelength $\lambda$=0.7 microns (mid-visible E-O portion of the spectrum).

There are two MTF curves shown in each of FIGS. 3A and 3B. One is a curve for a full unobscured circular aperture (d/D=0.0) and the other curve is for a circular aperture obscured 50% (d/D=0.5) by diameter. The 50% obscured curve is typical for Cassegrain lens types used in LOROP applications.

From FIG. 2 it can be seen that in the visible wavelengths, the potential MTF of the obscured lens is near 0.5 at a spatial frequency of 50 cycles/mm (corresponding to 10 micron size sensor detectors). This indicates that a centrally obscured Cassegrain type lens is an acceptable candidate for an E-O LOROP sensor in the visible wavelengths.

From FIGS. 3A and 3B, the problems that arise in LOROP optics used in the infrared wavelengths can be seen. For an unobscured (d/D=0.0) circular aperture at a wavelength of $\lambda$=4.0 microns (Mid-wavelength IR), the potential MTF is 50% at a spatial frequency of 16.7 cycles/mm (30 microns size detectors). Detectors of 30 micron size represent a very practical size for IR detector arrays. However, when one considers the obscured lens (d/D=0.5), the potential MTF drops below 25%, which is a poor MTF for an optical system that is expected to operate in the thermal infrared (low contrast) world. Therefore, the centrally obscured Cassegrain type lens is not a good candidate for an E-O LOROP sensor operating in the MWIR (3.0 to 5.0 micron) wavelengths.

In FIG. 3B, the limitations brought about by long wavelength operation in a LOROP sensor become clear. At f/6, a system using 30 micron size detectors operating in the LWIR band (8 to 12 micron) is worthless whether unobscured or obscured. If the detector size is increased to 75 microns, the MTF of the unobscured circular aperture is at an acceptable level, but the resolution of such a system is too low (6.7 cycles/mm at λ=10 microns) for typical LOROP requirements. For the obscured Cassegrain lens, the detectors would have to double in size (150 microns) to have an acceptable MTF with an f/6 lens.

Two statements can be made based on the curves of FIG. 3B. First, the Cassegrain lens form is not a good candidate for LOROP operation at LWIR wavelengths; and second, the LWIR spectrum (8.0 to 12.0 microns) is not the desired operating spectrum for slower aperture (high f/#) optical systems.

The Cassegrain lens form is an attractive lens candidate from a physical size and shape point of view, but there are three problems associated with it. The three problems are:

1. Loss of light due to obscuration size.
2. Loss of MTF due to obscuration size and central location.
3. Unfocussed stray light radiating onto the focal plane.

First, the loss of light. Referring to FIG. 1, the secondary reflector 12 and its associated light baffle 16 are positioned right in the center of the entrance pupil. Obviously, any light in the entrance pupil that impinges directly on the back of the secondary reflector is "lost light". Depending upon the size of the secondary compared to the entrance pupil, the light lost can vary from about 10% to over 40%. At an obscuration ratio of d/D=0.5, the light lost is 25%.

Second, the MTF of the Cassegrain lens is degraded by the central obscuration caused by the secondary reflector 12. In all cases, the greater the obscuration ratio, the greater the MTF loss, as can be seen in FIG. 2. In FIGS. 3A and 3B, the obscuration ratio is d/D=0.5. A larger obscuration ratio as required to support a typical field of view is likely to be necessary to eliminate unfocussed stray radiation, and this will lead to increased MTF losses.

The third problem associated with the Cassegrain lens form is stray-unfocussed radiation reaching the detector 14 focal plane. This unwanted radiation results in the loss of contrast in the image at the detectors. In FIG. 1, the obscuration is shown as 50% and with the secondary light baffles 16 and primary light baffles 18 as shown, there are still many ray paths that permit a ray to find the focal plane without ever having been focussed by the primary 10 and secondary 12 elements. The "stray light" problem arises because the length of the detector array 14 is a significant fraction of the obscuration size. As an example, the configuration illustrated in FIG. 1 is representative of the following:

Entrance pupil—12 inches

Obscuration—6 inches

Detector array length—4.5 inches

To alleviate the stray light problem the size of the obscuration ratio must increase, and this further degrades the lens MTF performance. To improve the lens MTF performance, the obscuration ratio must be reduced, but this leads to greater stray radiation problems.

The problems identified here are inherent in the Cassegrain lens form when applied to imaging on large detector arrays. The Cassegrain lens has been designed and built many times for small image sizes, but has significant problems producing large images.

To alleviate the MTF loss and stray light problems that are inherent in the Cassegrain lens form due to the central obscuration, the present invention provides a reconnaissance camera system having a lens form which substantially eliminates the central obscuration. This is achieved in an aspherical two-reflector catadioptric lens system with a decentered entrance pupil or aperture.

The present system is a two reflector decentered optical system. A centered optical system means that all of the lens components (both reflective and refractive) have a common optical axis and the center of the linear image also lies on this optical axis. However, in the present invention, the entrance pupil is not concentric with the lens optical axis. The total pupil is displaced laterally in a direction perpendicular to the linear detector array. The amount of the pupil displacement is such that the optical axis does not intersect the entrance pupil.

The present lens configuration may have a small residual obscuration; however, it is not a central obscuration and the obscuration enters the circular pupil from one side. To compensate for the light loss and MTF loss, the pupil diameter of a preferred embodiment of the present system is increased to an approximate rotationally asymmetric f/5 pupil. Preferably, a linear array detector is used to image the scene in the visible and near infrared portions of the spectrum. In the direction parallel to the linear array, the aperture is f/5 and in the scan direction (perpendicular to the array length) the aperture is about f/6.

Most prior art designs for classical Cassegrain and catadioptric lens objectives are rotationally symmetric and include a central obscuration. The central obscuration found in classical Cassegrain and catadioptric lens systems cause a loss of light and a loss of MTF as discussed above. Unobscured and decentered 2-mirror Cassegrain designs have been described in the prior art for use in astronomical applications. See, e.g., U.S. Pat. No. 1,578,899 to Lohmann; U.S. Pat. No. 3,674,334 to Offner. Unobscured and decentered 2-mirror Cassegrain designs have also been described in the technical literature. See Gelles, R., *Unobscured-Aperture Two-Mirror Systems*, Journal of the Optical Society of America, vol. 65, no. 10, pp. 1141–1143 (October 1975); Gelles, R., *Unobscured Aperture Stigmatic Telescopes*, Optical Engineering, vol. 13 no. 6, pp. 534–538 November/December 1974. However, these designs typically offer a small field of view (less than one degree full field) and/or may also have a large focal length to aperture ratio (F/number), thereby making the designs less attractive OR unusable for LOROP applications.

Other unobscured aperture tilted and/or decentered 3-mirror and 4-mirror lens designs have been described. See U.S. Pat. No. 4,226,501 to Schafer; U.S. Pat. No. 4,265,501 to Cook. These lens designs can be used for aerial photography, but generally require that the elements be mounted off axis or in a tilted configuration requiring difficult alignment. A 3 or 4-mirror reflective optical system having a comparable, focal length and F/number to that in the present invention would be expected to occupy more space than is ordinarily permitted in aerial photography applications. Since space allotted in an aircraft camera compartment is usually very limited, and particularly so in military aerial reconnaissance applications, a long focal length camera lens must be of a compact design and yet provide a low enough F/number to meet performance requirements. The present invention meets these space requirements, while also providing for large field of view and high MTF performance in a dual spectrum sensor system.

In sum, the optical system of the present invention addresses the problems normally associated with conventional centrally obscured Cassegrain or other catadioptric type lenses previously proposed for long focal length aerial reconnaissance applications. Furthermore, the present inventive optical system is ideally suited in multispectral applications, such as where one radiation receiving device images in the UV or visible portions of the spectrum, while a second radiation receiving device images in the IR.

SUMMARY OF THE INVENTION

The present invention is a multi-spectral decentered catadioptric-type optical system suitable for use with long range oblique aerial reconnaissance camera systems, spectrum analyzers, astronomical imagers, and other optical sensing applications. The optical system comprises a primary mirror and a secondary mirror for directing radiation from a scene onto first and second radiation receiving devices. The optical system defines an entrance aperture and the primary and secondary mirrors define an optical axis. The central aperture is displaced relative to the optical axis, such that the entrace aperature is either partially or totally unobscured.

The secondary mirror directs the incident radiation onto a means for splitting the radiation to a first optical path and a second optical path. A first field optical assembly is placed in the first optical path for directing radiation in a first portion of the electromagnetic spectrum onto the first radiation receiving device, such as a film camera or electro-optical detector. A second field optical assembly is placed in the second optical path for directing radiation in a second portion of the electromagnetic spectrum, for example, wavelengths in the infrared portion of the spectrum, onto a second radiation receiving device, such as an electro-optical detector.

The optical system permits dual spectrum imaging by the first and second detector of both visible and infrared portions of the spectrum, while providing improved modulation transfer performance in both portions of the spectrum. Further, the optical system is especially suitable for applications requiring a long focal length optical system and a wide field of view, such as found in long range aerial reconnaissance camera systems and astronomical imagers.

The present inventive optical system has rotational symmetry about an optical axis which is external to the lens. The primary and secondary reflective elements comprise the light collection and image forming optics which operate over the combined spectral bands required for multispectral imaging applications. The majority of the optical power resides in these elements.

The design of the optical system in the present invention uses an obscuration which is located substantially at the edge of the aperture, which result in the phenomenon that the MTF is not significantly depressed at useful mid-range spatial frequencies. Rather, the decentered obscuration suppresses the MTF at spatial frequencies beyond the useful limit or Nyquist frequency of the imaging detectors. This has incidental beneficial effects, namely reducing the aliasing and MTF bounceback in the resulting imagery at spatial frequencies beyond the Nyquist limit when observing a scene or target which is periodic in nature. Preferably, the relative obscured area is only 10% to 15% of the primary mirror aperture.

The present inventive optical system may be incorporated into an aerial reconnaissance camera system that has two or more discrete detectors to accomplish dual or multi-spectrum operation. In the case of dual spectrum operation, the incoming light is directed past the primary mirror to a beamsplitter, where the visible and/or near infrared portion of the beam is directed through the first set of field optics onto a camera means (such as an electro-optic detector or film camera) that images in the visible and possibly near infrared portion of the spectrum. A second portion of the beam is directed through the beamsplitter and through the second set of field optics and possibly a relay lens to an MWIR or LWIR electro-optical detector array.

The present invention is capable of collecting the imagery to be used for sensor fusion which occurs between the two optical detectors over the field of view which is common to both detectors (i.e., in both spectral bands) as long as both detectors are scanning the same scene. The common field of view over which sensor fusion is achieved may be adjusted by changing the focal length of one optical path relative to the other by, for example, changing the magnification of the MWIR or LWIR relay lens.

BRIEF DESCRIPTION OF THE DRAWINGS

Presently preferred embodiments of the invention are described below in conjunction with the accompanying drawing figures, in which like reference numerals refer to like elements in the various views, and wherein:

FIG. 1 is a schematic diagram of a prior art Cassegrain optical system;

FIG. 2 is a graph of the MTF for an f/6 annular aperture catadioptric optical system with the central obscuration ratio (d/D) of 0, 0.25, 0.5 and 0.75 for a wavelength of 0.7 microns (mid-visible portion of the spectrum);

FIGS. 3A and 3B are graphs of the modulation transfer function (MTF) as a function of spatial frequency in cycles/mm for the system of FIG. 1 at wavelengths in the MWIR and LWIR, respectively;

FIG. 4C shows is a simplified schematic of a second embodiment of the invention, showing the central aperture of the optical system displaced from the optical axis such that the secondary causes a small obscuration at the edge of the aperture;

FIG. 4D shows the system aperture for the system of FIG. 4C, showing the small obscuration caused by the secondary mirror due to the lesser amount of displacement of the central aperture from the optical axis as compared to FIGS. 4A and 4B;

FIG. 5 is a perspective view of an embodiment of a multi-spectral decentered catadioptric optical system according to the present invention, including the field optics for both the visible/near infrared optical path and the mid-wavelength infrared optical path;

FIG. 13 shows the ray aberrations at relative field angles for the visible spectrum path 28 for the embodiments of FIGS. 5–11;

FIG. 20 shows the ray aberrations at relative field angles for the MWIR spectrum path;

DESCRIPTION OF THE PREFERRED AND ALTERNATIVE EMBODIMENTS OF THE INVENTION

Figure 4A:
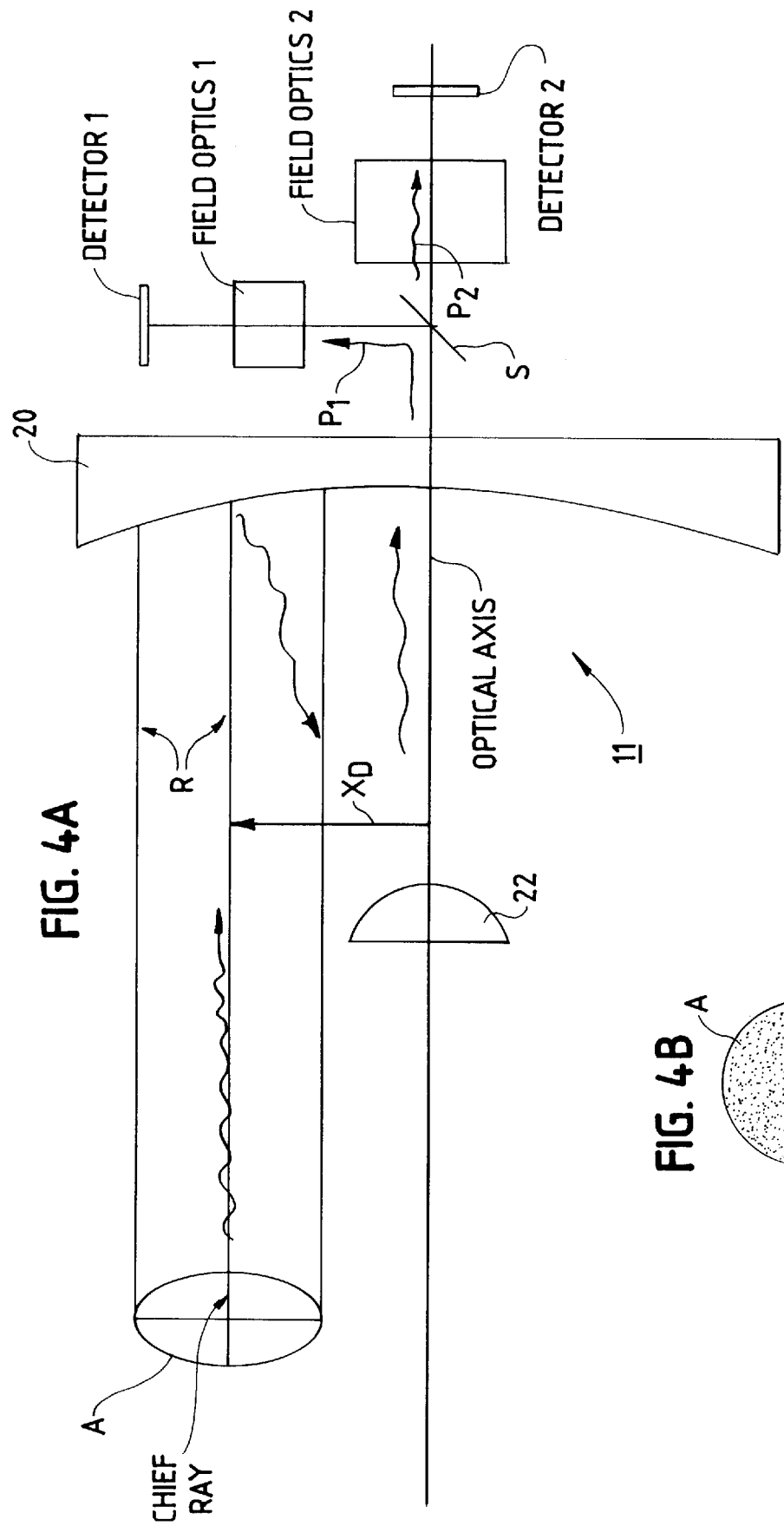
FIG. 4A is a simplified schematic of the inventive optical assembly, showing the central aperture of the optical system displaced from the optical axis and showing the first and second field optical assemblies directing radiation onto first and second sensors imaging at different portions of the electromagnetic spectrum.

The following discussion of presently preferred and alternative embodiments of the invention will be more readily apprehended with reference to FIGS. 4A–4D, which illustrate some the basic principles of the invention in a somewhat simplified embodiment. With reference to FIG. 4A, the optical system 11 of the present invention includes a central generally circular aperture A, which defines a region R through which radiation is directed onto a primary mirror 20. The radiation reflects off of the primary mirror 20 onto a secondary mirror 22, which directs the radiation past the primary mirror 20 to a means S for splitting the radiation into two paths. Path P1 is for radiation in a first portion of the electromagnetic spectrum, such as visible, ultraviolet or near infrared (e.g. 200 to 900 nm), and radiation in this path passes through a first field optical assembly (Field Optics 1) onto a first detector (Detector 1). The path P2 is for radiation in a second portion of the spectrum (such as infrared, for example 3–5 microns). The radiation in path P2 passes through a second set of field optics onto a second detector (Detector 2).

Figure 4B:
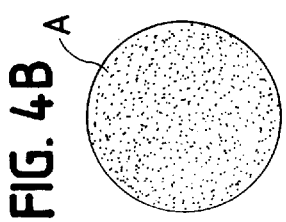
FIG. 4B shows the system aperture for the system of FIG. 4A, with no obscuration caused by the secondary mirror due to the amount of displacement of the central aperture from the optical axis.

Note that in FIG. 4A, the central aperture is displaced from the optical axis by an amount XD. The decentered aperture increases the modulation transfer function of the system 11. In the example of FIG. 4A, the displacement amount XD is such that the secondary mirror 22 does not obstruct the optical path, as shown in FIG. 4B.

Turning to FIG. 4C, an alternative embodiment is shown. In FIG. 4C, the displacement amount $X_d$ is lesser than in FIG. 4A, resulting in a small residual obscuration caused by the secondary mirror. This obscuration is shown in FIG. 4D. The particular performance criteria for the optical system will dictate whether a completely unobscured Cassegrain type of system as shown in FIG. 4A will yield an acceptable design, or whether a partially obscured system is to be used. However, with either choice, the modulation transfer function can be improved for the resulting system, or compared with a centrally obscured system and yet produce a system which is satisfactory in two different portions of the spectrum, such as visible and infrared.

Referring now to FIG. 5, a more detailed presently preferred embodiment of the multi-spectral decentered catadioptric optical system according to the present invention is shown in a perspective view. The system includes an aspheric primary mirror 20 and an aspheric secondary mirror 22. Incident radiation 24 from a decentered entrance aperture reflects off the primary mirror and secondary mirror 22 through an aperture 23 below the primary mirror 20 and onto a beamsplitter 26 or other alternative means for separation of the spectral paths (such as a flip mirror). A first portion of the incident radiation, preferably in the visible or near infrared portions of the spectrum, is reflected off the beamsplitter 26 and through a set of first field optical elements 30 which direct incident radiation 24 along the first optical path 28 onto a first radiation receiving device or detector 29 (such as a film camera or electro-optical sensor). The beamsplitter is displaced off the optical axis of the system, as shown better in FIG. 9.

Figure 6:
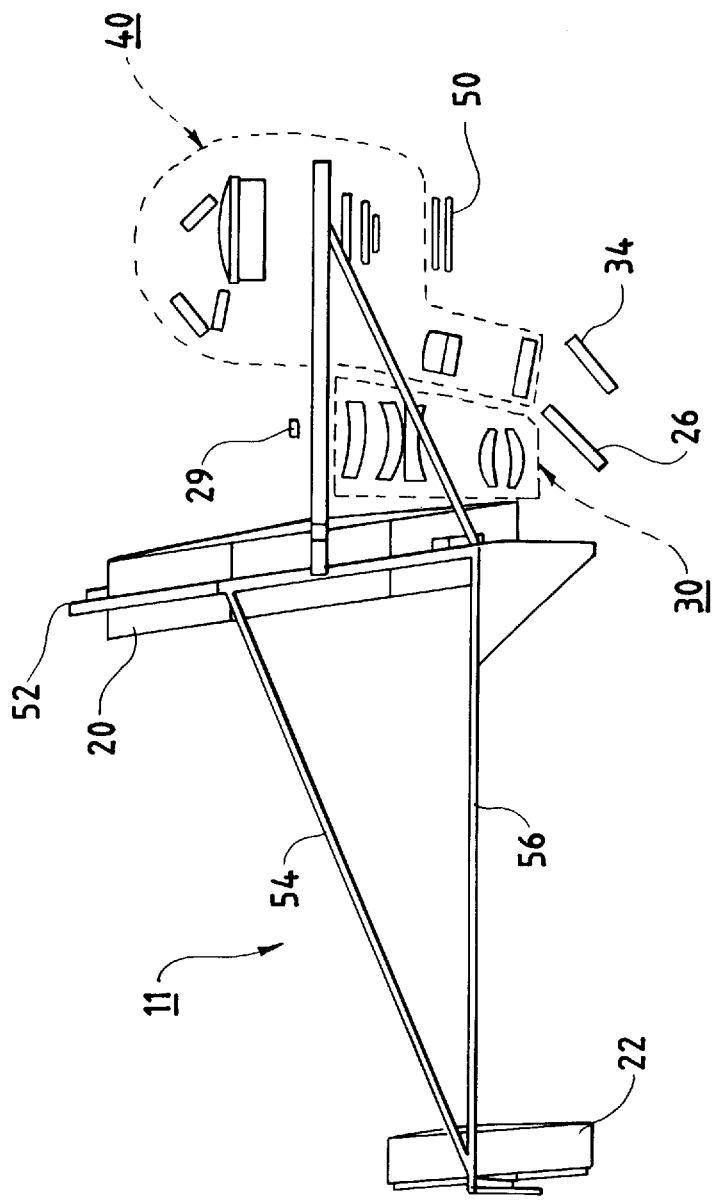
FIG. 6 is a side elevational view of the optical assembly of FIG. 5.

Radiation passing through the beamsplitter 26 will preferably be in a second portion of the electromagnetic spectrum, such as the mid-wavelength infrared (MWIR) and/or long wavelength infrared (LWIR). The MWIR and/or LWIR radiation reflects off a mirror 34 as shown in FIG. 6 and through a second set of field optics 40 in a second optical path 36. The MWIR and/or LWIR field optics 40 direct the radiation onto a second radiation receiving device 50, such as a electro-optical detector.

Figure 9:
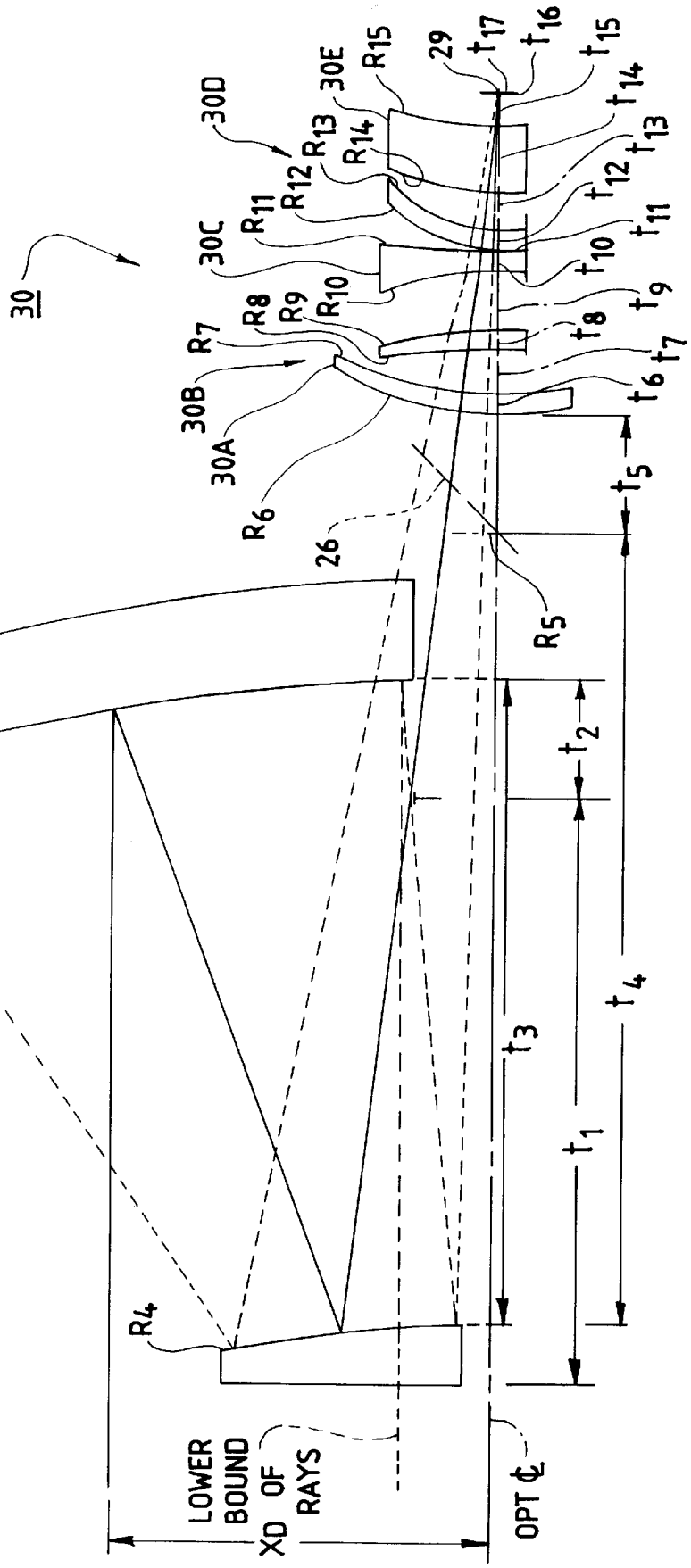
FIG. 9 is an illustration of the straight-line optical path of the visible spectrum path of FIG. 5 in the XZ plane of FIG. 5.

In FIG. 5, the aperture of the optical system is displaced relative to the optical axis of the system. This is more clearly shown in FIG. 9, showing the upper and lower bounds of the incident rays, the optical centerline OPT CL, and the displacement $X_d$.

The system shown in FIG. 5 includes conventional lens mounting and supporting structures, most of which have been deleted in order to more clearly illustrate the optical system per se. The mounting and supporting structures include a primary support ring 52, a pair of secondary trusses 54 and connecting arms 56. Any other suitable mounting structure would be acceptable. The field optics 30 and 40 are mounted into the housing for the system in conventional fashion. Light blocking baffles for the primary and secondary mirrors 20 and 22 are also deleted from FIG. 5, but persons of skill in art will be capable of providing suitable baffling for the optical system.

In FIG. 5, the axes X, Y and Z define the axes of the overall optical system. The axes X', Y' and Z define the axes of the primary mirror. In the presently preferred aerial reconnaissance camera embodiment, the primary mirror 20 as viewed from the Z' axis is diametrically asymmetric and has an f/5 focal ratio as measured along the YZ meridional plane and has an f/6 focal ratio in the XZ meridional plane. The system has a focal length of 72 inches. In the preferred embodiment, the visible and near infrared detector 29 is preferably a linear electro-optical detector, and is oriented perpendicular to the XZ plane. Similarly, the MWIR or LWIR detector 50 is preferably also a linear electro-optical detector, and is oriented perpendicular to the XZ plane. The detector 29 imaging in the visible portion of the spectrum could also be a film-type camera.

Figure 7:
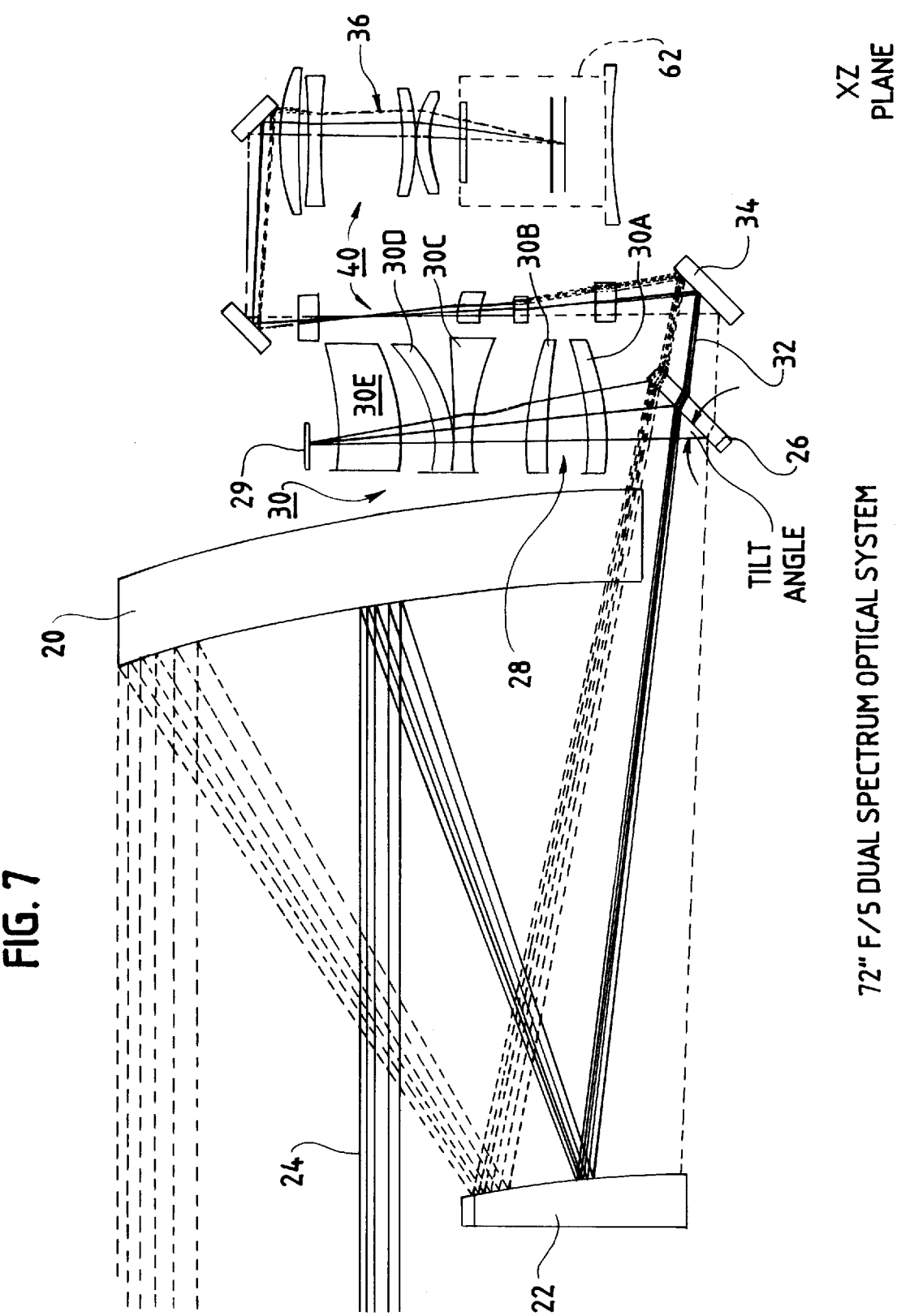
FIG. 7 is another side elevational view of the optical assembly of FIGS. 5 and 6, showing both the visible/near infrared and MWIR optical paths for incident radiation. The embodiment of FIG. 5 has a 50 degree tilt angle along the visible optical path 28 and the infrared optical path 36, whereas in FIG. 7, the tilt angle is 45 degrees. The selection of different tilt angles is primarily one dictated by space constraints for the optical system, and will require some minor optimization of the field optics in the IR path 36.
Figure 10:
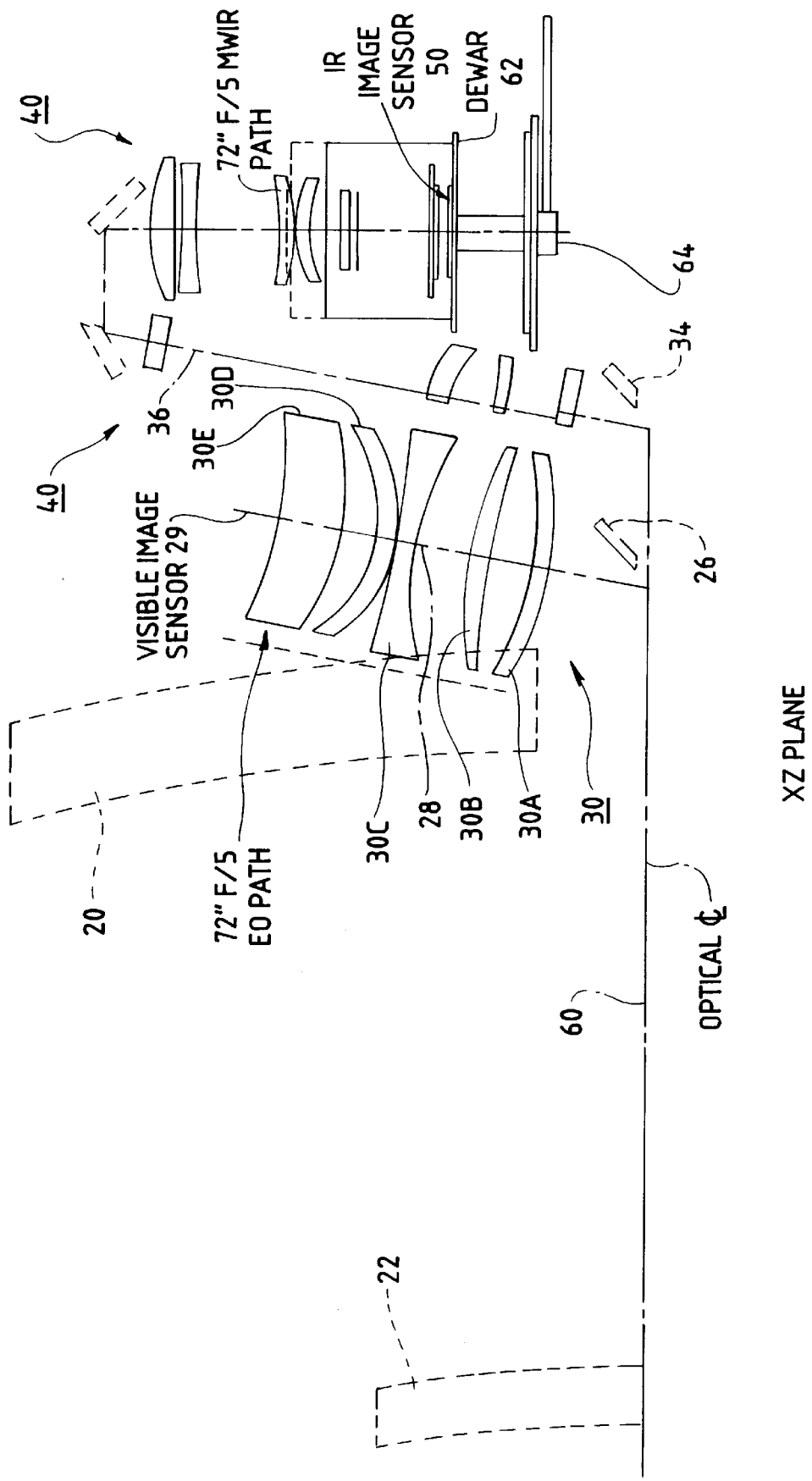
FIG. 10 shows a variation in packaging of the field optics of FIGS. 5–7 to achieve full-round visible/near-infrared field optics and truncated optics in the MWIR path, showing the beamsplitter 26 and mirror 34 displaced off the optical center line or axis of the optical system to intercept the actual ray bundles.
Figure 11:
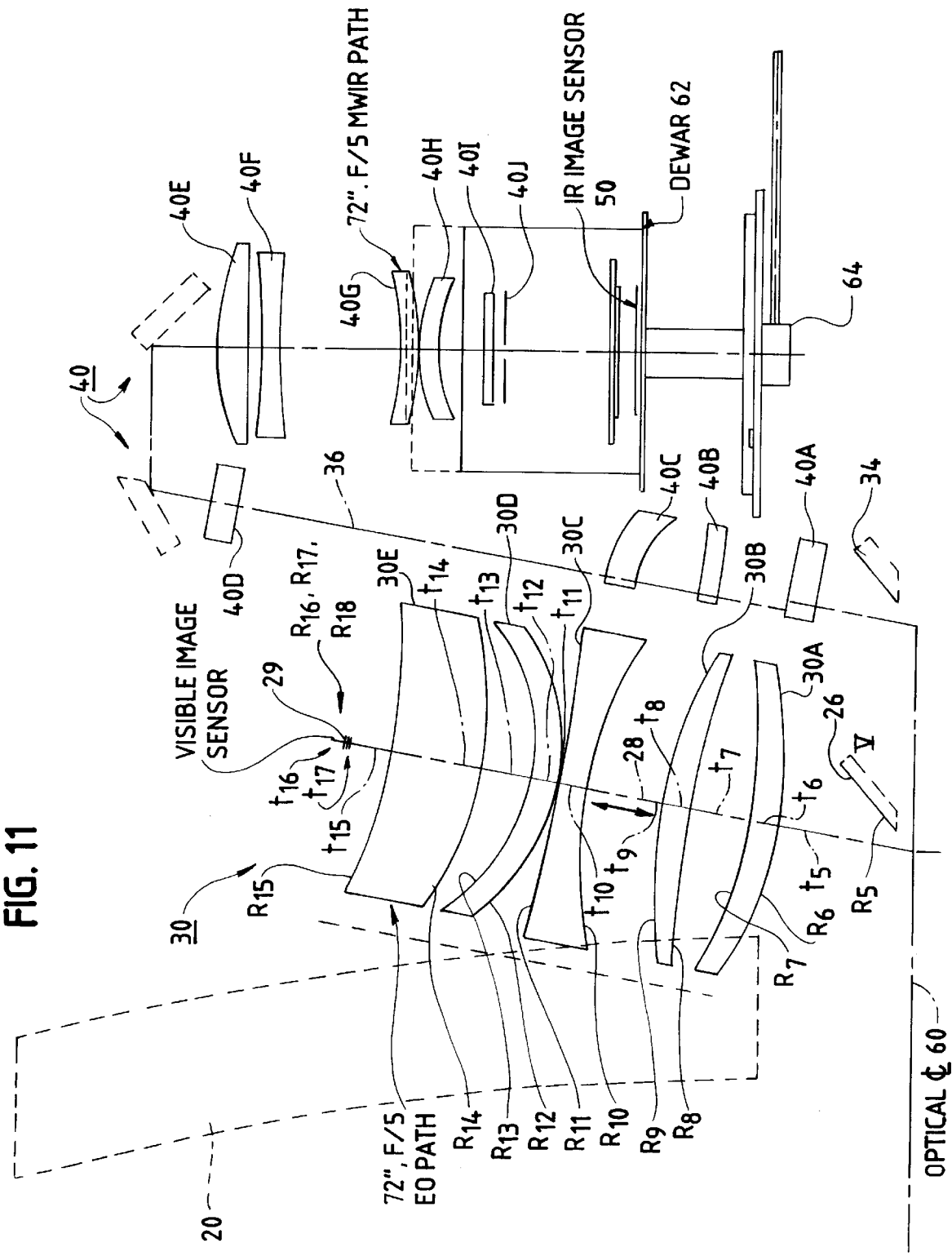
FIG. 11 is a more detailed illustration of the field optics of FIG. 8, showing the radii and the thicknesses of the optical elements from TABLE 1.

FIG. 6 is a side elevational view of the optical system of FIG. 5. FIG. 7 shows the ray path for incident radiation 24 through an alternative embodiment of the optical system of FIG. 5 and FIG. 6. While in the preferred embodiment the lens elements of the first field optics 30 for the visible and infrared portions of the spectrum could be truncated half lenses, as shown in FIG. 7, it is preferable from a manufacturing point of view to make the field optics 30 for the visible/near-IR from full round optical elements, as shown in FIGS. 10 and 11. The field optics for the MWIR or LWIR path includes several truncated half lenses, as shown in FIGS. 10 and 11. Additionally, it will be noted that the optical path 28 for the visible and near IR is tilted at a different angle in FIG. 10 as compared to FIG. 7. The tilt angle is generally determined by available space in the camera housing and does not effect performance to a critical degree. The embodiment of FIG. 5 has a 50 degree tilt angle along the visible optical path 28 and the infrared optical path 36, whereas in FIG. 7, the tilt angle is 45 degrees. The selection of different tilt angles is primarily one of space constraints in the optical system, and will require some minor optimization of the field optics in the IR path 36.

Figure 8:
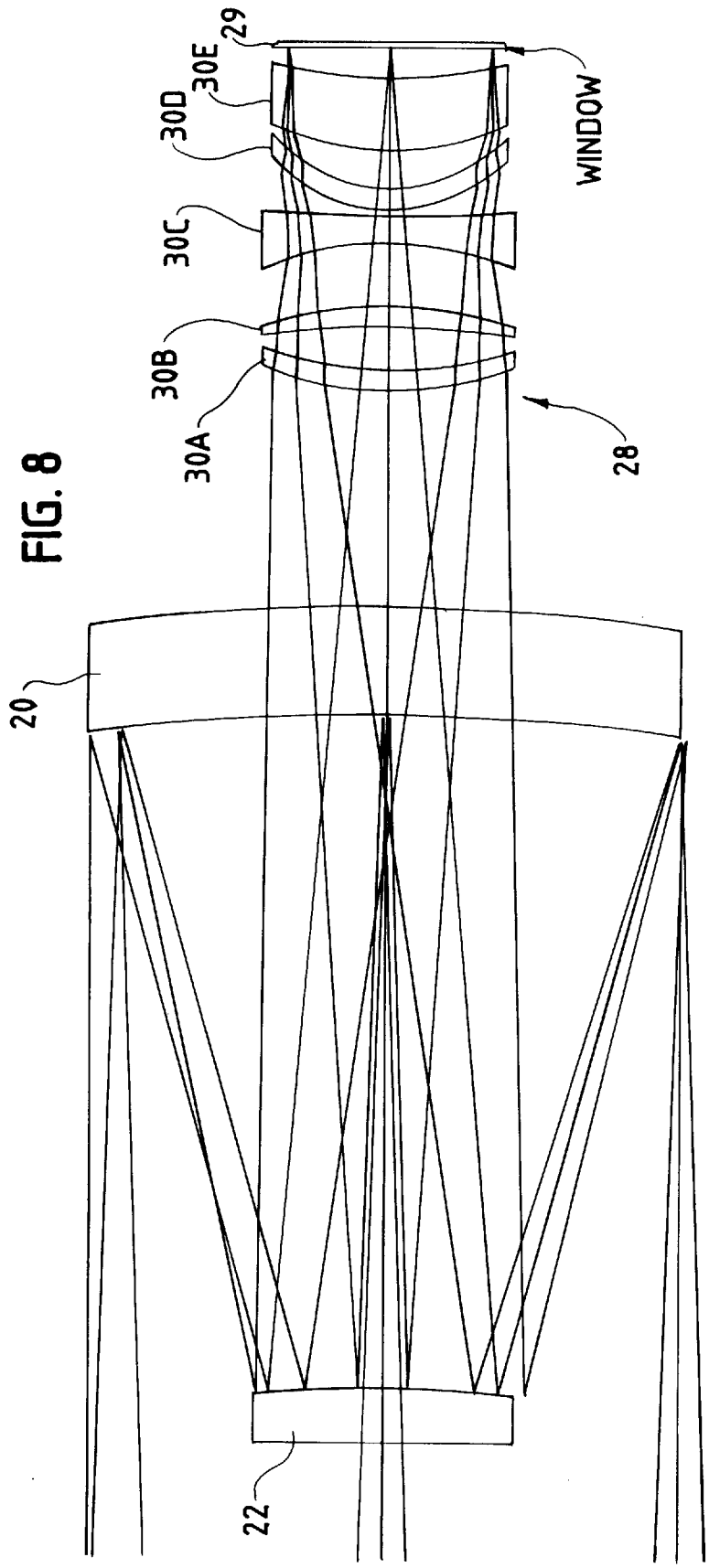
FIG. 8 is an illustration of the straight-line optical path of the visible spectrum path of FIG. 5 in the YZ plane of FIG. 5.
Figure 18:
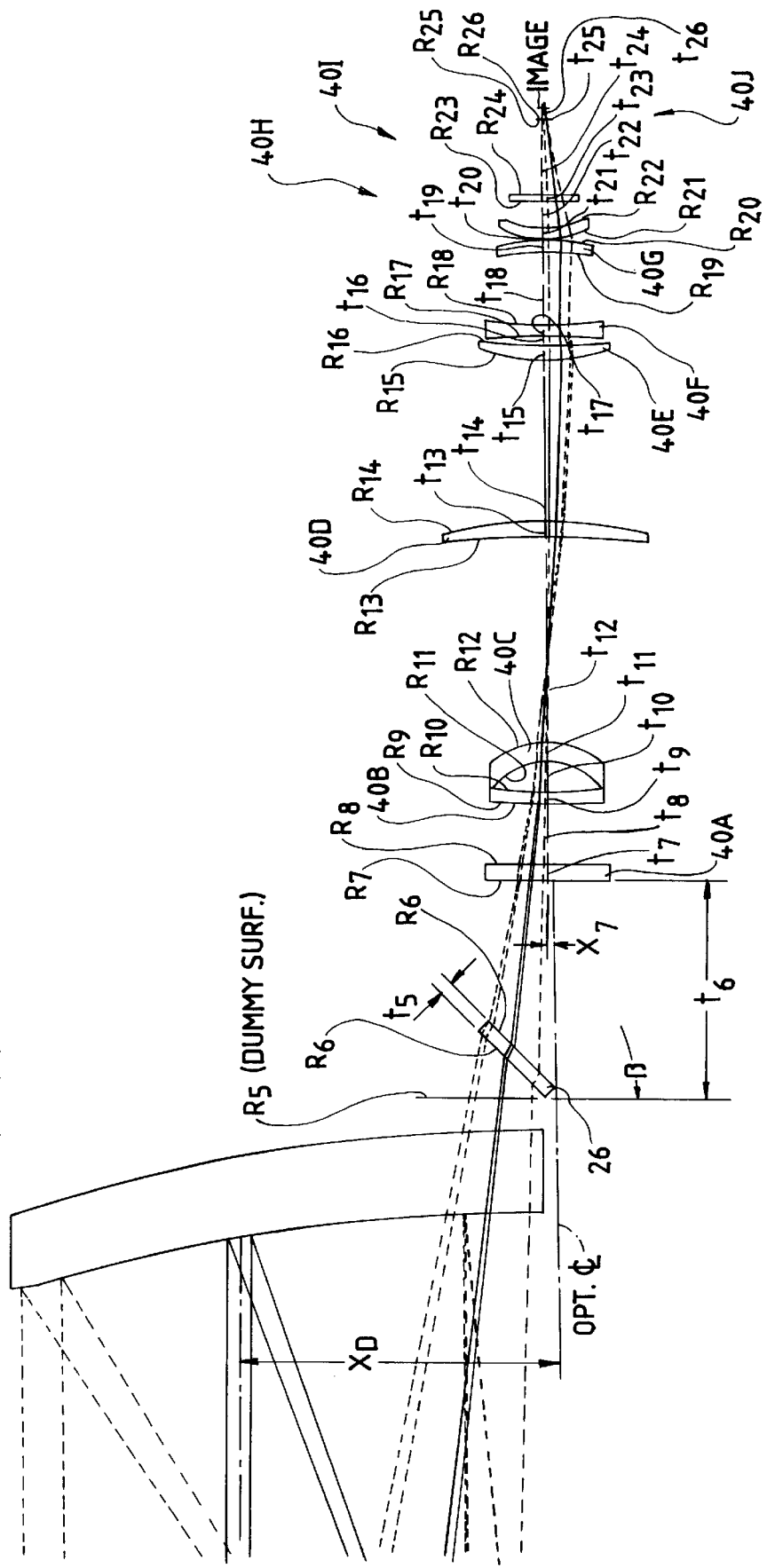
FIG. 18 is a detailed illustration of the MWIR field optics 40 of FIG. 17, showing the radii and thicknesses of the optical elements from TABLE 2.

FIG. 8 is an illustration of the straight-line optical path of the visible spectrum path of FIG. 5 in the YZ plane of FIG. 5. FIG. 9 is an illustration of the straight-line optical path of the visible spectrum path of FIG. 5 in the XZ plane of FIG. 5. The visible field optical assembly 30 includes individual elements 30A, 30B, 30C, 30D, and 30E. A preferred prescription of the lenses 30A–30E is found in TABLE 1 for the subject aerial reconnaissance camera embodiment. The surfaces, radii, and thickness $t_i$ from TABLE 1, where the subscript represents the surface number, are indicated in FIG. 9. The the surfaces, radii, and thickness $t_i$ from TABLE II are indicated in FIG. 18.

Note that in FIGS. 9 and 11, the detectors 29 and 50 are linear devices with their long axis perpendicular to the plane of the page. Note also in FIG. 11 that the MWIR or LWIR detector 50 is housed in a dewar liquid nitrogen cooled device 62 to suppress dark current and thereby enhance the thermal sensitivity of the sensor. The entire dewar 62 and IR sensor 50 is installed on a camera mount 64 in conventional fashion.

Note further in FIG. 10 that the beamsplitter 26 and the reflector 34 need only be located off of the optical axis or optical centerline 60 to intercept the useful radiation. The field optics 30 are centered on the optical centerline as shown.

The lens prescription for the asymmetric primary 20 and secondary mirrors 22, and the optical elements in both the field optics 30 and 40 for a preferred aerial reconnaissance embodiment of the invention illustrated in FIGS. 5–7 is given below. In Table 1, the unit of thickness is inches. The quantity $n_d$ is the index of refraction for incident radiation at 587 nm. The quantity $v_d$ is the quantity $(n_d-1)/(n_f-n_c)$, where $n_f$ is the index of refraction at 486 nm and $n_c$ is the index of refraction at 656 nm. The entries in the column TYPE refer to the Abbe value of the lens. It will be noted that Zinc Selenide, Silicon and Germanium types of lenses are preferred for some of the field optical elements 40 in the MWIR and LWIR optical path, the selection due to the particular range of frequencies of interest in the present aerial reconnaissance application. It will be appreciated that these values will change depending on the particular application for the multi-spectral decentered catadioptric optical system, and the invention of course should not be considered limited to the particular prescription of the preferred embodiment.

The sag value for an aspheric surface is given by the following formula:

$$Z = \frac{ch^2}{\{1 + \text{sqrt}\{1 - (1+k)^2 ch^2\}} + Ah^4 + Bh^6 + Ch^8 + Dh^{10}$$

where,

Z=sag of the surface parallel to the Z axis c=curvature of the surface at the vertex (Z=0)=1/R h=height above the Z axis k conic coefficient;

k=0: sphere;

−1<k<0:ellipsoid with Z axis=major axis k=−1: paraboloid k<−1: hyperboloid

For the Primary Mirror (20 in Table I and Table II)

c=1/−51.695640=−0.019344 k=−0.793490

A=0.381673E-06

B=−0.296160E−10
C=0.894148E−13
D=−0.111224E−15

For the Secondary Mirror (22 in Table I and Table II), which is a conic, c=1/−29.477690=−0.033924
k=−5.741358

TABLE I

Example I - Lens Prescription for
Preferred Embodiment of Visible E-O Path as shown in FIG. 9

| Ele. | Description | Radii | Thickness | Dec | $n_d$ | $v_d$ | Type |
|---|---|---|---|---|---|---|---|
| I | Ent. Aper. | $R_1$ = plano | $t_1$ = 13.9495 | | 1.0 | | |
| II | Stop | $R_2$ = plano | $t_2$ = 3.0 | 9.5 ($X_D$) | 1.0 | | |
| 20* | Asph. Pri. | $R_3$ = 51.69564 | $t_3$ = −15.9495 | | 1.0 | | Refl |
| 22** | Con. Sec. | $R_4$ = −29.47769 | $t_4$ = 19.5012 | | 1.0 | | Refl |
| 26 | B/S | $R_5$ = plano | $t_5$ = 3.0 | | 1.0 | | |
| | | $R_6$ = 7.7605 | $t_6$ = .5 | | | | |
| 30A | Fld elt1 | | | | 1.8052 | 25.43 | 805254 |
| | | $R_7$ = 9.0663 | $t_7$ = 1.0851 | | | | |
| | | $R_8$ = −19.8816 | $t_8$ = .5113 | | | | |
| 30B | Fld elt2 | | | | 1.54814 | 45.75 | 548458 |
| | | $R_9$ = −9.1627 | $t_9$ = 1.4383 | | | | |
| | | $R_{10}$ = −7.4475 | $t_{10}$ = .5 | | | | |
| 30C | Fld. elt3 | | | | 1.7552 | 27.58 | 755276 |
| | | $R_{11}$ = 37.7927 | $t_{11}$ = .0100 | | | | |
| | | $R_{12}$ = 3.8077 | $t_{12}$ = .500 | | | | |
| 30D | Fld. elt4 | | | | 1.54814 | 45.75 | 548458 |
| | | $R_{13}$ = 3.6576 | $t_{13}$ = .9148 | | | | |
| | | $R_{14}$ = 6.4966 | $t_{14}$ = 1.6500 | | | | |
| 30E | Fld. elt5 | | | | 1.68273 | 44.50 | 683445 |
| | | $R_{15}$ = 10.3887 | $t_{15}$ = .7699 | | | | |
| | | $R_{16}$ = plano | $t_{16}$ = .050 | | | | |
| | Window | | | | 1.5168 | 64.17 | 517645 |
| | | $R_{17}$ = plano | $t_{17}$ = .050 | | | | |
| | Image | $R_{18}$ = plano | $t_{18}$ = .0038 | | | | |

*see formula for primary mirror above
**see formula for secondary mirror above

TABLE II

Example I - Lens Prescription for
Preferred Embodiment of MWIR Path

| Ele. | Description | Radii | Thickness | Dec | $n_{1B}$ | v | Type |
|---|---|---|---|---|---|---|---|
| I | Ent.Aper. | $R_1$ = plano | $t_1$ = 13.9495 | | 1.0 | | |
| II | Stop | $R_2$ = plano | $t_2$ = 3.0 | X = 9.5 ($X_D$) | 1.0 | | |
| 20 | Asph. Pri. | $R_3$ = −51.69564 | $t_3$ = −15.9495 | | 1.0 | | Refl |
| 22 | Con. Sec. | $R_4$ = −29.47769 | $t_4$ = 19.5012 | | 1.0 | | Refl |
| | | $R_5$ = plano | $t_5$ = .4 | β = 45 | 2.433140 | 177.59 | ZnSe |
| 26 | B/S | | | | | | |
| | | $R_6$ = plano | $t_6$ = 6.4182* | | 1.0 | | Refr |
| | | $R_7$ = 476.1328 | $t_7$ = .5 | $X_7$ = −0.1959 | | | ZnSe |
| 40A | Cyl | | | | | | |
| | | $R_8$ = plano | $t_8$ = 1.80616 | | | | |
| | | $R_9$ = 53.0736 | $t_9$ = 0.34255 | | | | |
| 40B | | | | | 2.433140 | 177.59 | ZnSe |
| | | $R_{10}$ = 12.93300 | $t_{10}$ = 0.9104 | | | | |
| | | $R_{11}$ = −2.11628 | $t_{11}$ = 0.6000 | | | | |
| 40C | | | | | 2.433140 | 177.59 | ZnSe |
| | | $R_{12}$ = −2.53370 | $t_{12}$ = 6.1180 | | | | |
| | | $R_{13}$ = −31.67434 | $t_{13}$ = 0.5058 | | | | |
| 40D | | | | | 3.425406 | 240.95 | Silicon |
| | | $R_{14}$ = −12.04525 | $t_{14}$ = 4.8000 | | | | |
| | | $R_{15}$ = 5.37500 | $t_{15}$ = 0.5000 | | | | |
| 40E | | | | | 3.425406 | 240.95 | Silicon |
| | | $R_{16}$ = 23.64230 | $t_{16}$ = 0.2632 | | | | |
| | | $R_{17}$ = −20.50420 | $t_{17}$ = 0.3500 | | | | |
| 40F | | | | | 4.024610 | 102.22 | Germmw |
| | | $R_{18}$ = 14.11227 | $t_{18}$ = 2.1753 | | | | |
| | | $R_{19}$ = −7.32850 | $t_{19}$ = 0.3375 | | | | |
| 40G | | | | | 3.425406 | 240.95 | Silicon |
| | | $R_{20}$ = −5.30475 | $t_{20}$ = 0.0200 | | | | |
| | | $R_{21}$ = 2.8118 | $t_{21}$ = 0.3531 | | | | |

TABLE II-continued

Example I - Lens Prescription for
Preferred Embodiment of MWIR Path

| Ele. | Description | Radii | Thickness | Dec. | $n_{1B}$ | v | Type |
|---|---|---|---|---|---|---|---|
| 40H | | | | | 3.425406 | 240.95 | Silicon |
| | | $R_{22}$ = 3.1199 | $t_{22}$ = 0.8010 | | | | |
| | | $R_{23}$ = Plano | $t_{23}$ = 0.2000 | | | | |
| 40I | Window | | | | 3.425406 | 240.95 | Silicon |
| | | $R_{24}$ = Plano | $t_{24}$ = 0.2000 | | | | |
| 40J | STOP | $R_{25}$ = Plano | $t_{25}$ = 2.0000 | X = −0.318 | | | |
| | | $R_{26}$ = INFINITY | $t_{26}$ = 0.0600 | | | | |
| | Filter | | | | 4.024610 | 102.22 | Germmw |
| | | $R_{27}$ = INFINITY | $t_{27}$ = 0.340 | | | | |
| | Image | $R_{28}$ = INFINITY | $t_{26}$ = 0.00 | | | | |

$$V = \frac{N_{\lambda B}}{n_{\lambda A} - n_{\lambda C}}$$ where $\lambda_A$ = 300 nm, $\lambda_B$ = 4000 nm and $\lambda_C$ = 5000 nm

*measured from R5 along original optical axis

As noted earlier, the primary mirror 20 is preferably a decentered section of a larger (parent) aspheric mirror. The secondary mirror 22 is also aspheric, and is a decentered section of a smaller mirror. If the primary and secondary mirrors 20 and 22, respectively, were paraboloidal and hyperbolodial, they would form a classical Cassegrain optical system. However, in the present inventive system they may be higher order decentered sections of aspheric surfaces. In one embodiment, the primary mirror is bilaterally symmetrical about a first plane (such as the XZ plane in FIG. 5) but not symmetrical about a second plane orthogonal to the first plane, such as the YZ plane.

The primary mirror 20, secondary mirror 22 and beamsplitter 26 form a compact system which occupies less space for the same relative aperture than a comparable prior art 3-mirror system referenced earlier.

The field group of lenses 30 (FIG. 9) and their respective surfaces are designed to work only in one spectral region such as the visible and near-IR portions of the spectrum. The second set of field optics 40 (FIGS. 10, 11, 16) is required for an alternate spectral band such as MWIR, and may be either located in place of the first field elements 30 by interchanging the first field optics 30 with the second group 40, or the second field group 40 may be located behind the first group as shown in FIG. 10. The beamsplitter 26 allows the alternate spectral energy to pass through the second field optics 40 to the MWIR and/or LWIR detector 50.

Figure 12B:
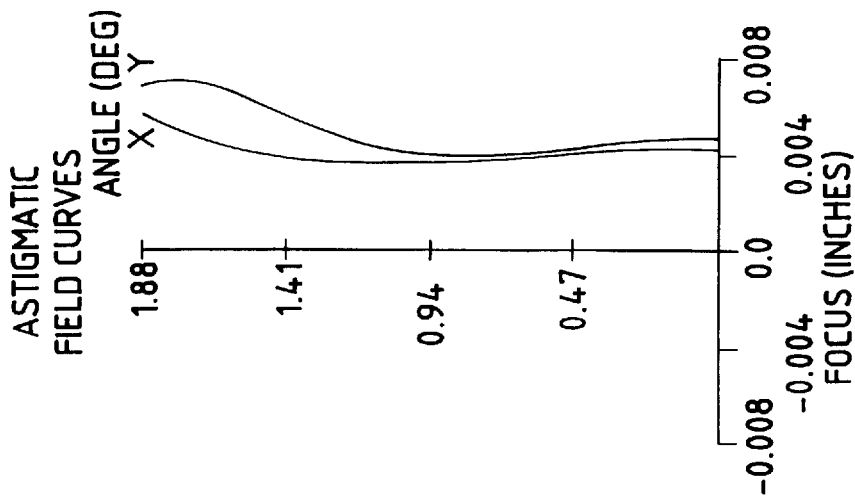
FIGS. 12A and 12B show the longitudinal spherical aberration and astigmatic field curves for the visible spectrum path 28 for the embodiments of FIGS. 5–11.
Figure 12A:
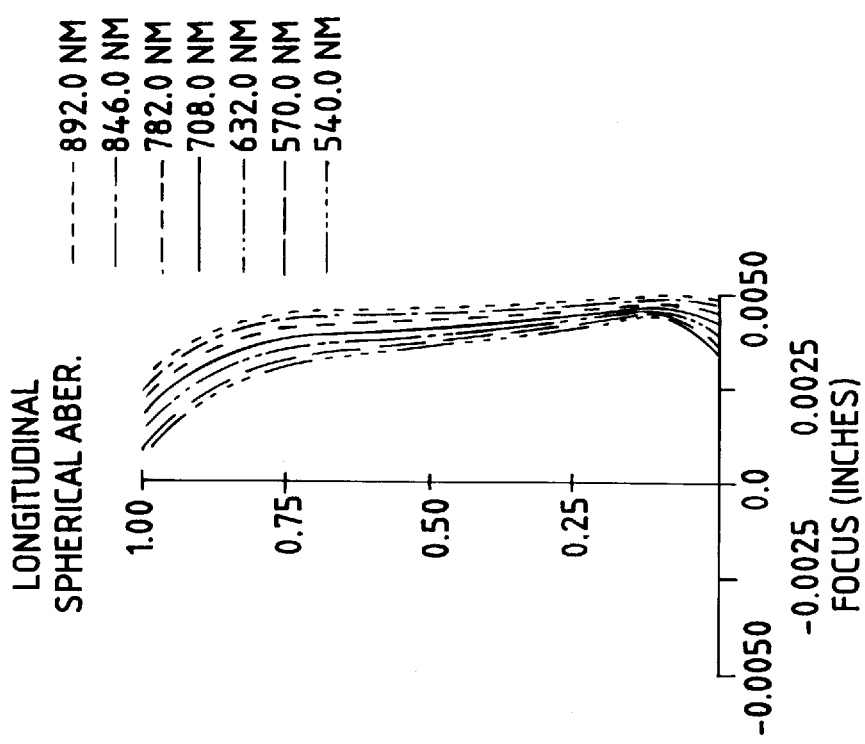

FIG. 12A is a graph of the longitudinal spherical aberration for the visible path field optics 30 of FIG. 9 at small deviations from the focus. The astigmatic field curves for the visible path are shown in FIG. 12B and indicate astigmatism to be corrected within 0.004 inch over the entire field. The ray aberrations for the visible spectrum path 28 shown in graphical form in FIG. 13, and show that the secondary spectrum over the extended vidual and near IR region is preserved in a well behaved fashion due to glass selection for the visible field optics.

The distortion data for the visible 28 and infrared 38 optical paths are shown in Table III. These data confirm that the absolute distortion as shown in the rightmost column of each table is less than one pixel (which is preferably 10 um for the visible path and 30 um for hte IR path), thus indicating that both the visible E-O and IR systems would be suitable for use in mapping and sensor fusion applications.

TABLE 3

| θ (deg.) | x, image (inch) | (A) y, image (inch) | (B) 72 tanθ (inch) | A-B | Dst* |
|---|---|---|---|---|---|
| Distortion/Mapping of Visible & IR Paths | | | | | |
| A. Visible Optical Path EFL = 71.9631 inch (visible) | | | | | |
| 0 | 0 | 0 | 0 | 0 | 0 |
| 0.2 | 0.000122 | 0.251234 | 0.251328 | −0.000094 | −0.04% |
| 0.4 | 0.000037 | 0.502474 | 0.502663 | −0.000189 | −0.04 |
| 0.6 | −0.000066 | 0.753732 | 0.754010 | −0.000278 | −0.04 |
| 0.8 | −0.000202 | 1.005024 | 1.005375 | −0.000351 | −0.04 |
| 1.0 | −0.000365 | 1.256378 | 1.256765 | −0.000387 | −0.03 |
| 1.2 | −0.000543 | 1.507828 | 1.508185 | −0.000357 | −0.02 |
| 1.4 | −0.000725 | 1.759409 | 1.759642 | −0.000233 | −0.01 |
| 1.6 | −0.000894 | 2.011115 | 2.011142 | −0.000027 | −0.00 |
| 1.8 | −0.001025 | 2.262785 | 2.262691 | 0.000094 | −0.00 |
| 1.88 | −0.001058 | 2.363325 | 2.363326 | −0.000001 | −0.00 |
| B. MWIR Optical Path EFL(Y) = 72.9188 inch (MWIR) EFL(X) = 70.5886 inch | | | | | |
| 0 | 0 | 0 | 0 | 0 | 0 |
| 0.1 | 0.000033 | 0.125642 | 0.125664 | −0.000022 | −0.02% |
| 0.2 | 0.000130 | 0.251294 | 0.251328 | −0.000034 | −0.01 |
| 0.3 | 0.000279 | 0.376966 | 0.376995 | −0.000029 | −0.01 |
| 0.4 | 0.000462 | 0.502663 | 0.502663 | 0.000000 | 0 |
| 0.5 | 0.000654 | 0.628385 | 0.628334 | 0.000051 | 0.01 |
| 0.6 | 0.000824 | 0.754125 | 0.754010 | 0.000115 | 0.02 |
| 0.7 | 0.000934 | 0.879871 | 0.879690 | 0.000181 | 0.02 |
| 0.8 | 0.000935 | 1.005594 | 1.005375 | 0.000219 | 0.02 |
| 0.9 | 0.000769 | 1.131247 | 1.131066 | 0.000769 | 0.02 |
| 1.0 | 0.000358 | 1.256765 | 1.256765 | 0.000000 | 0 |

Dst* Distortion of visible E-O design computed relative to a perfect 72 inch EFL lens.
Dst** Distortion of MWIR design computed relative to a perfect 72 inch EFL lens.

Figure 14:
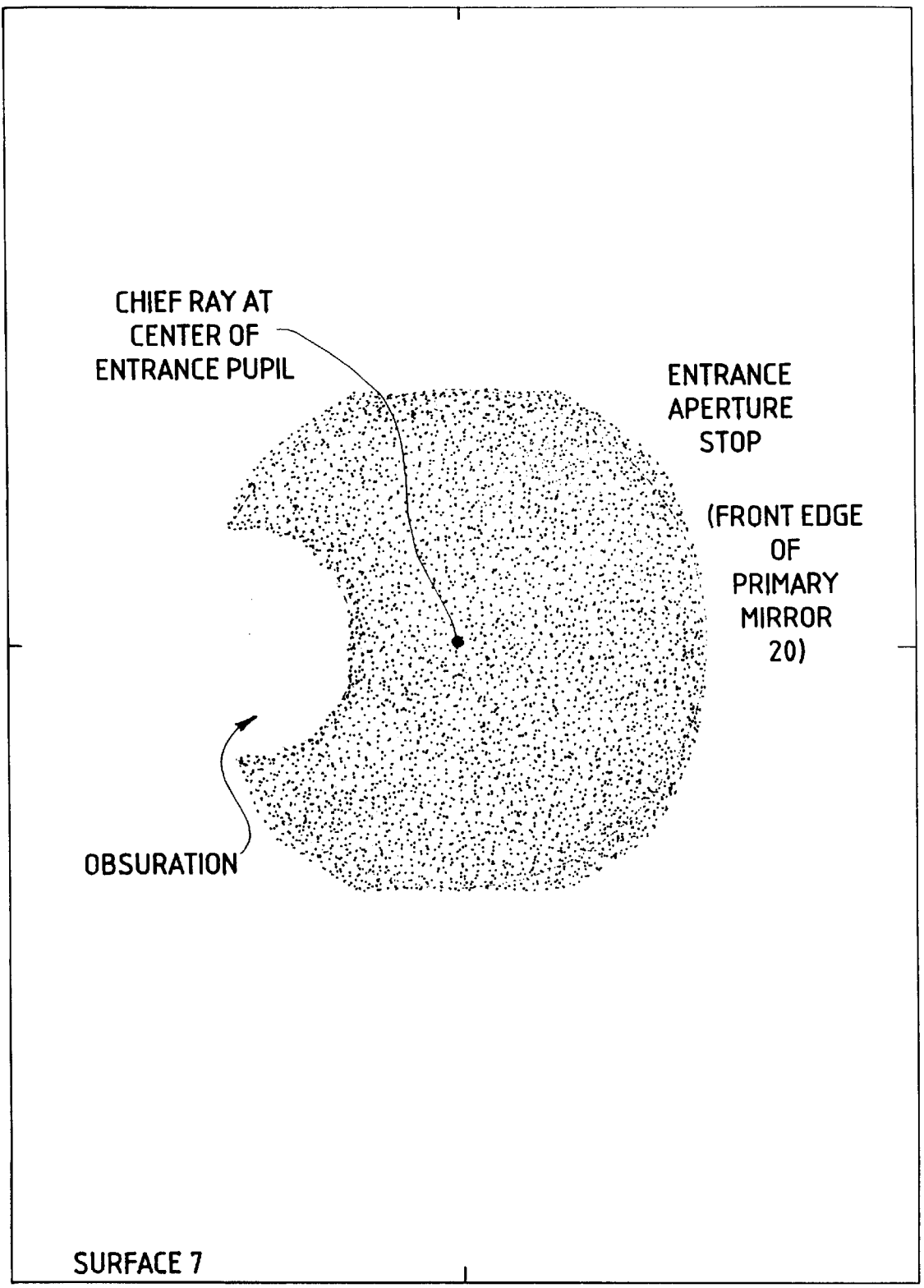
FIG. 14 is an illustration of the residual obscuration caused by the secondary mirror 22 of FIG. 8 due to the decentering of the system aperture off of the optical axis (i.e., the secondary mirror located at the side of the entrance aperture stop), showing the relative loss of approximately 10 to 15% of lens aperture.
Figure 15:
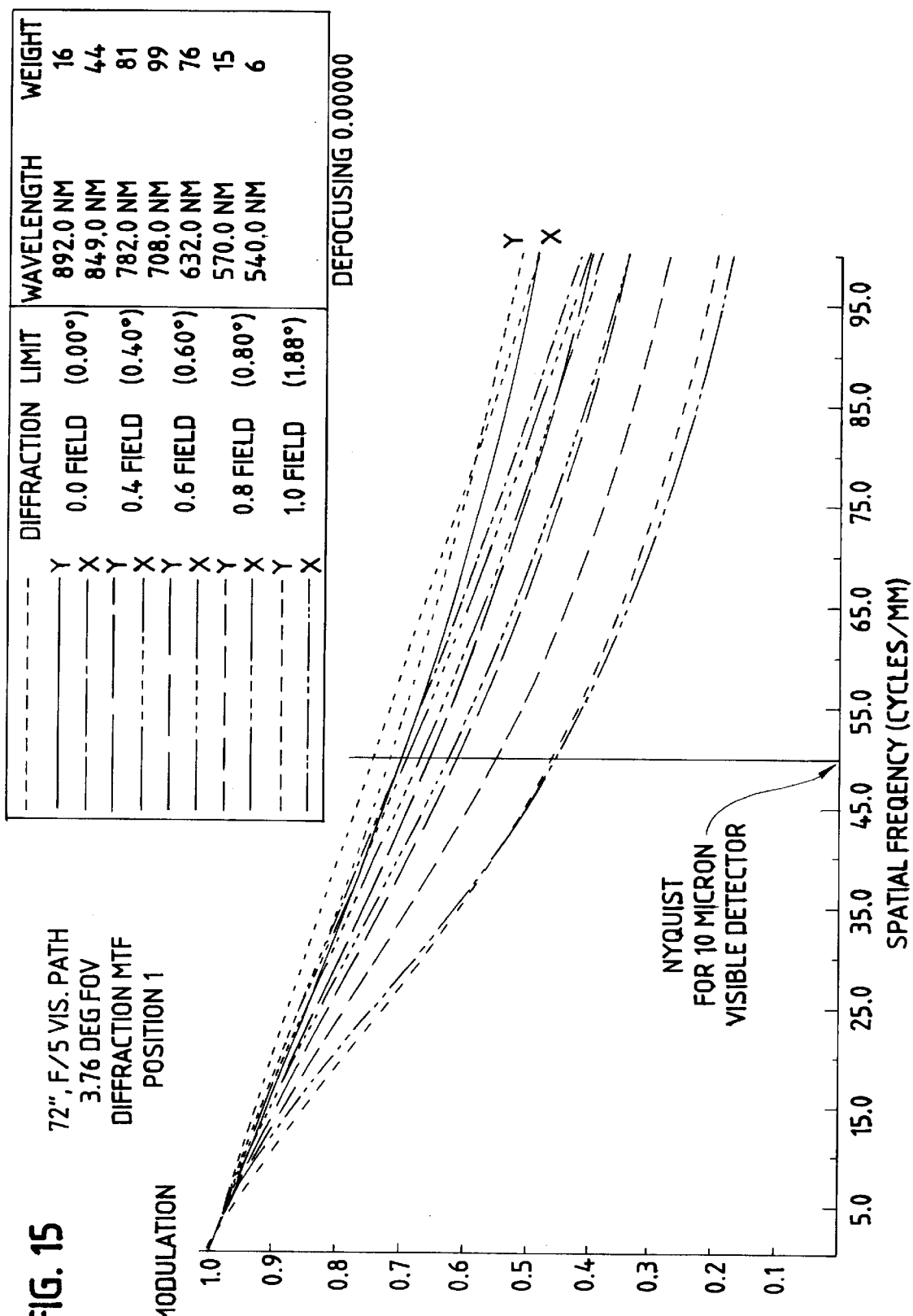
FIG. 15 is a graph of the MTF as a function of spatial frequency for the visible path of the optical system of FIG. 5, where the incident radiation is in the visible and near infrared portions of the spectrum, and specifically between 540 nm and 892 nm.

FIG. 14 illustrates the location of the obscuration due to the secondary mirror 22 relative to the entrance aperture stop for the embodiment of FIGS. 5–11. Note that the obscuration is substantially at the edge of the system aperture, i.e., decentered, resulting in desirable MTF curves for the system. The configuration of the perimeter of the pupil is circular with truncated edges on three sides corresponding to the primary mirror shape shown in FIG. 5. This shape is subject to change with different embodiments of the invention. The MTF curves illustrated in FIG. 15 show the potential MTF performance available in the visible spectrum for the system of FIG. 5. It should be noted in FIG. 15 that the potential modulation at Nyquist for a 10 micron pixel size (50 cycles/mm) is generally above the 50% level (0.5 modulation) for the weighted wavelengths between 540 nm and 892 nm as shown in the table at the upper right corner of FIG. 15.

Figure 16:
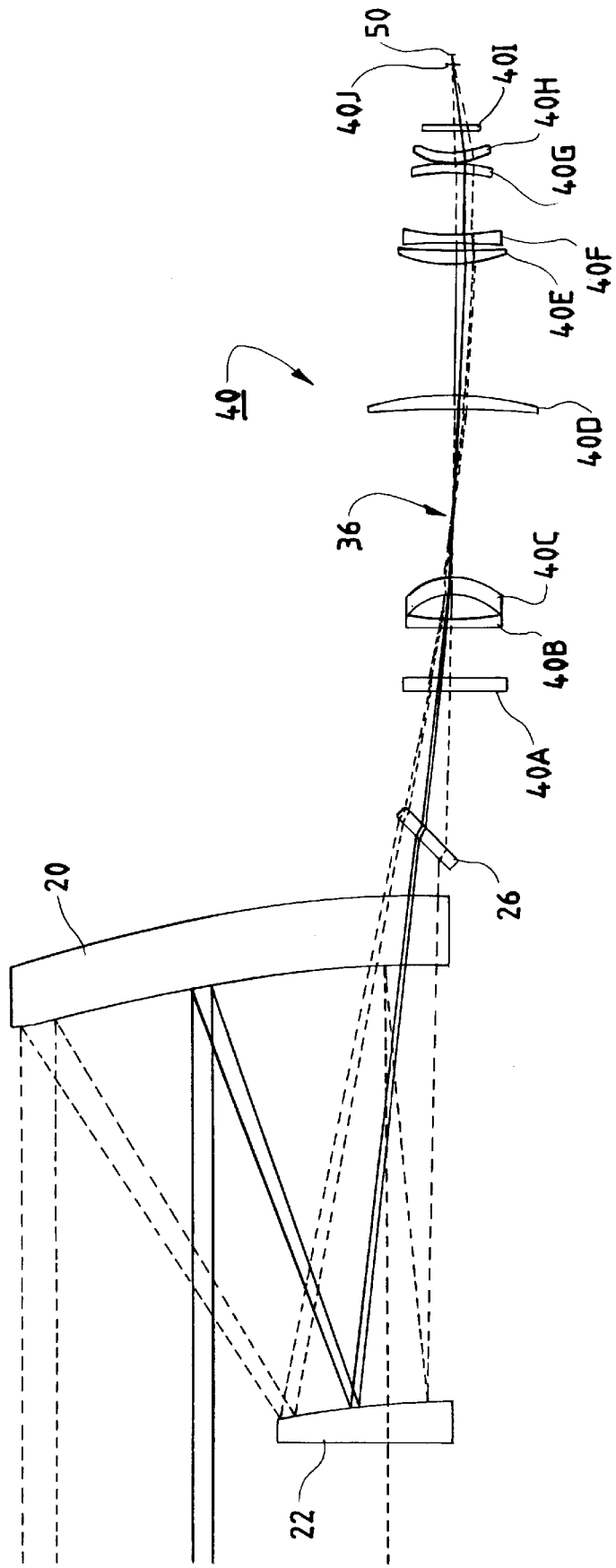
FIG. 16 is a straight line ray illustration of the MWIR path 36 of FIG. 5, taken in the X–Z plane of FIG. 5.
Figure 17:
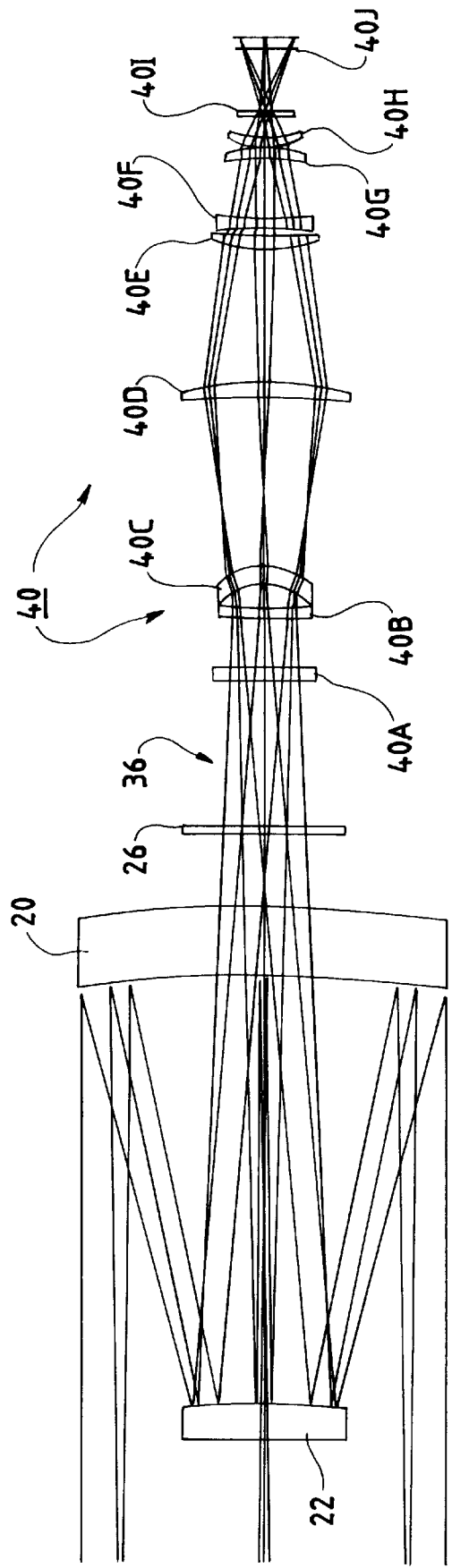
FIG. 17 is a straight line ray illustration of the MWIR path 36 of FIG. 5, taken in the Y–Z plane of FIG. 5.

Referring now to FIG. 16, the MWIR optical path 36 is shown in a straight line illustration taken in the XZ plane. The MWIR path 36 is shown in the YZ plane in FIG. 17. The field optics 40 comprises optical elements 40A–40J. The prescription for the optical elements is found in TABLE II above. FIG. 18 shows the thickness, radii of curvature for the elements in TABLE II.

Figure 19B:
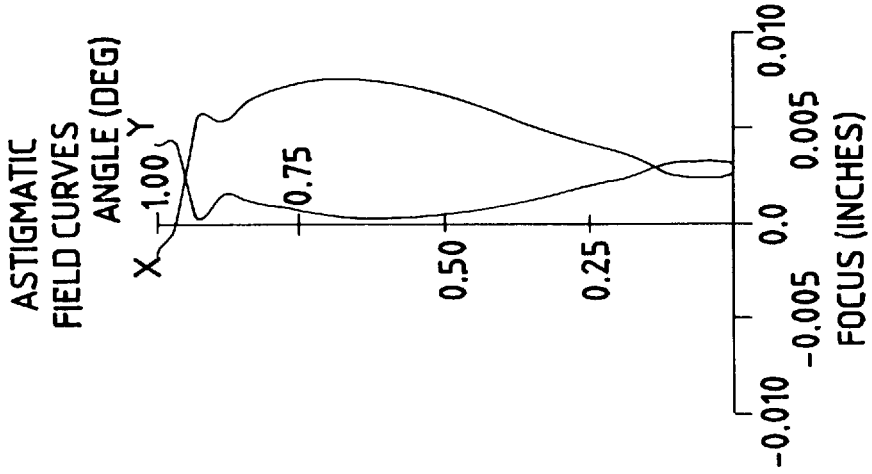
FIGS. 19A and 19B are graphs of the longitudinal spherical aberration and astigmatic field curves, respectively, for the MWIR field optics of FIG. 18.
Figure 19A:
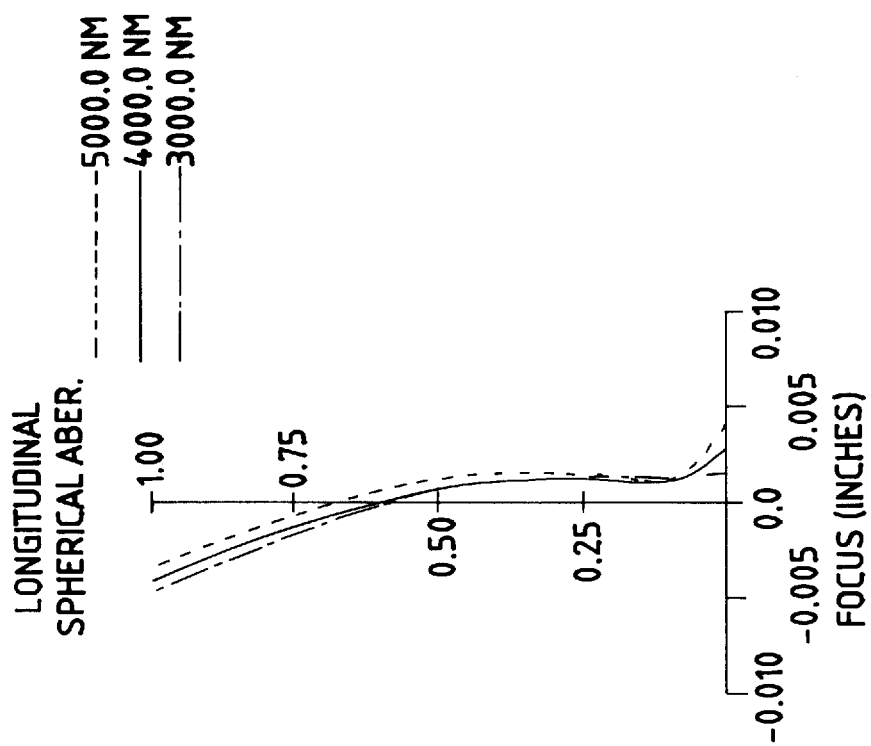

FIG. 19A is a graph of the longitudinal spherical aberration for the field optics 40 of FIG. 19 at small deviations from the focus. The astigmatic field curves for the field optics 40 are shown in FIG. 19 B. The increased astigmatism (approximately 0.005 over the field) as compared to 0.004 for the visible path remains small, when the relative detector pixel size of 30 um versus 10 um for the visible path is taken into consideration. The ray aberrations for the MWIR path is shown in graphical form in FIG. 20.

Figure 21:
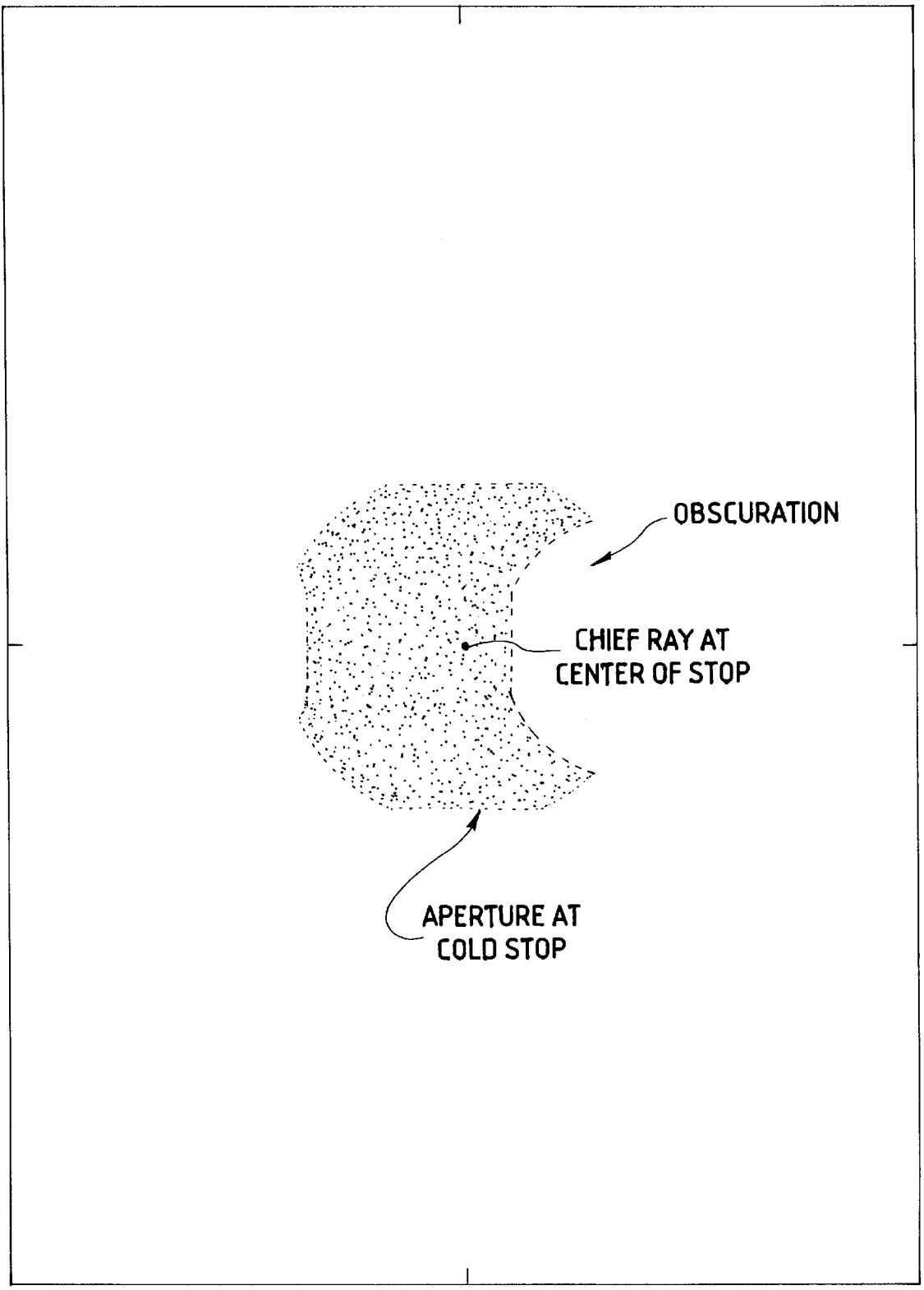
FIG. 21 shows the decentered obscuration due to the secondary 22 relative to the aperture at the cold stop inside the dewar in the MWIR path.

FIG. 21 shows the obscuration caused by the secondary mirror 22 located at the side of the aperture, taken at the cold stop inside the dewar 62. In order to avoid thermal effects from the edges of the optical elements in the MWIR path, the cold stop aperture is carefully sized to avoid vignetting within the IR optical train. Additionally, effects due to Narcissis are avoided by appropriate tilts to avoid retroreflections and by optimal ghost image analysis.

Figure 22:
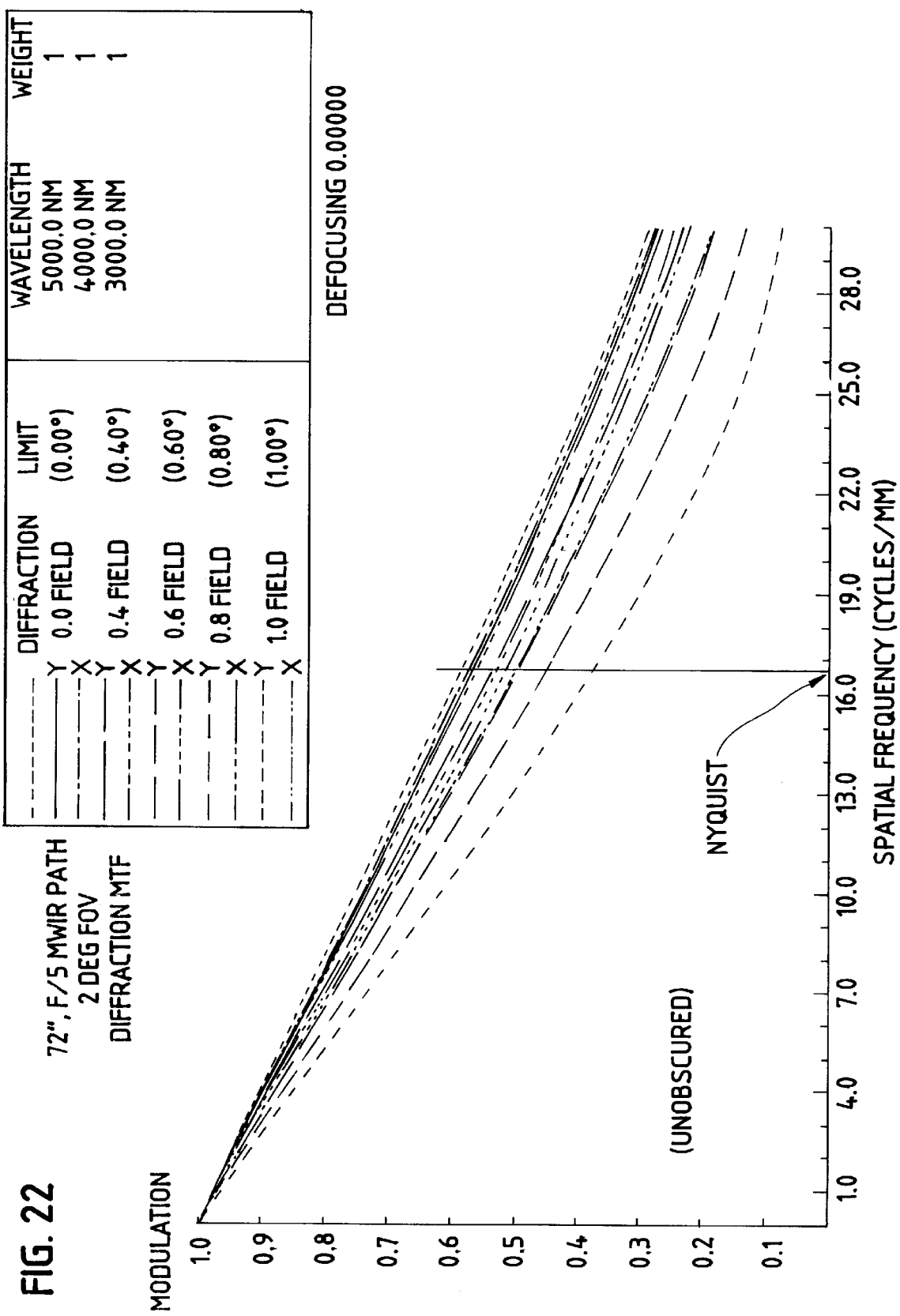
FIG. 22 is a graph of the modulation transfer function as a function of spatial frequency for an optical system with an unobscured aperture in wavelengths in the MWIR portion of the spectrum.
Figure 23:
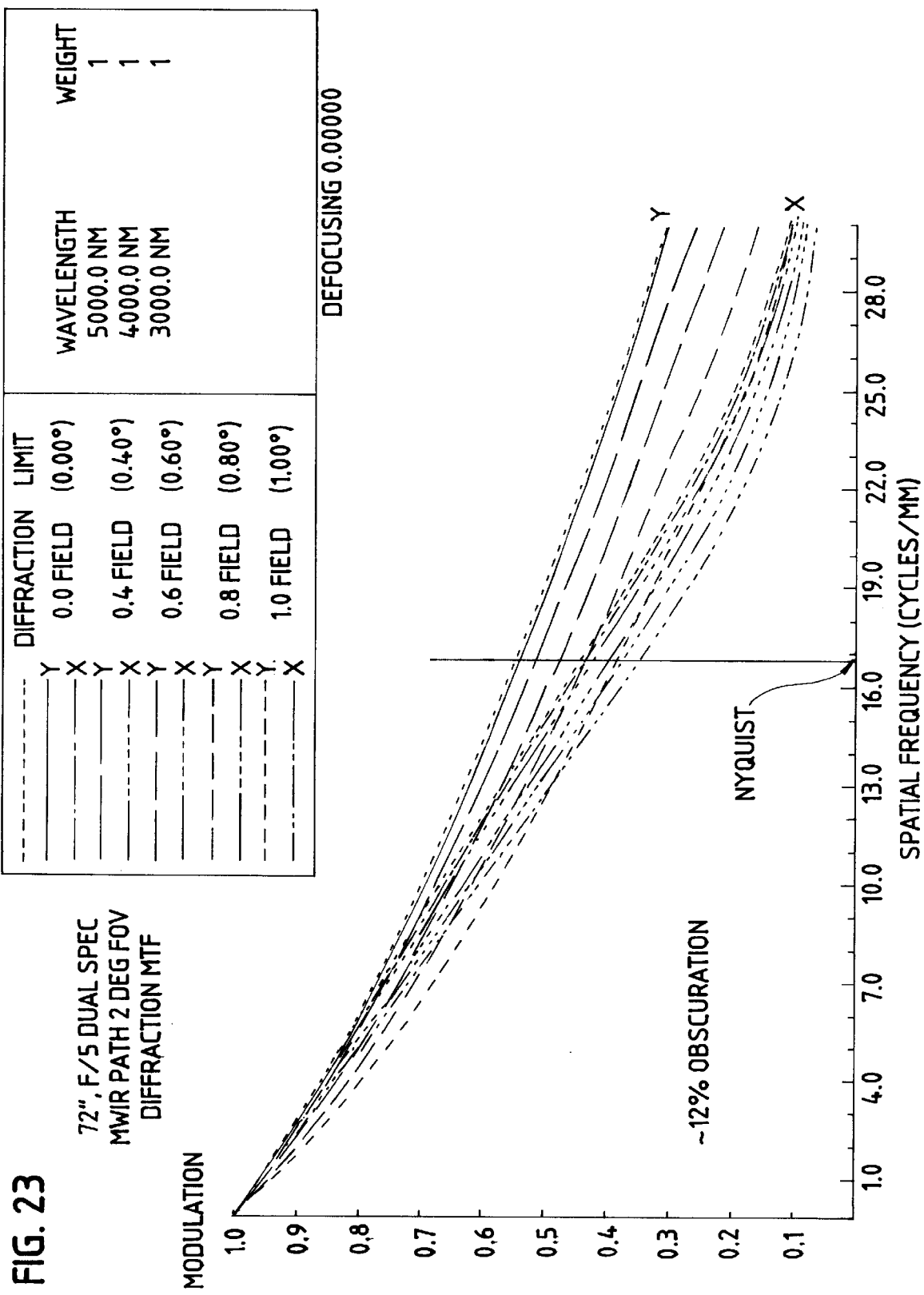
FIG. 23 is a graph of the modulation transfer function as a function of spatial frequency for an optical system with a decentered obscuration of the central aperture of approximately 12 % in accordance with the embodiment of FIG. 5, for radiation in wavelengths in the MWIR portion of the spectrum.

FIG. 22 is a graph of the modulation transfer function of an unobscured optical system at wavelengths in the MWIR portion of the spectrum, as a function of spatial frequency. FIG. 23 is a graph of the modulation transfer function for the MWIR path for the embodiment of FIGS. 5 and 16–18, with a relative obscuration of roughly 12 percent. Note that the MTF performance below Nyquist is within a few percent of the performance for an unobscured system. At spatial frequencies above Nyquist, the MTF curves are generally below 50 percent. However, as shown in FIG. 22, the X-axis data MTF drops rapidly beyond Nyquist which is actually a beneficial effect in terms of reducing MTF bounceback and aliasing effects for targets or scene objects that are periodic in nature. For non-periodic objects (the vast majority), aliasing is not an issue.

Figure 24:
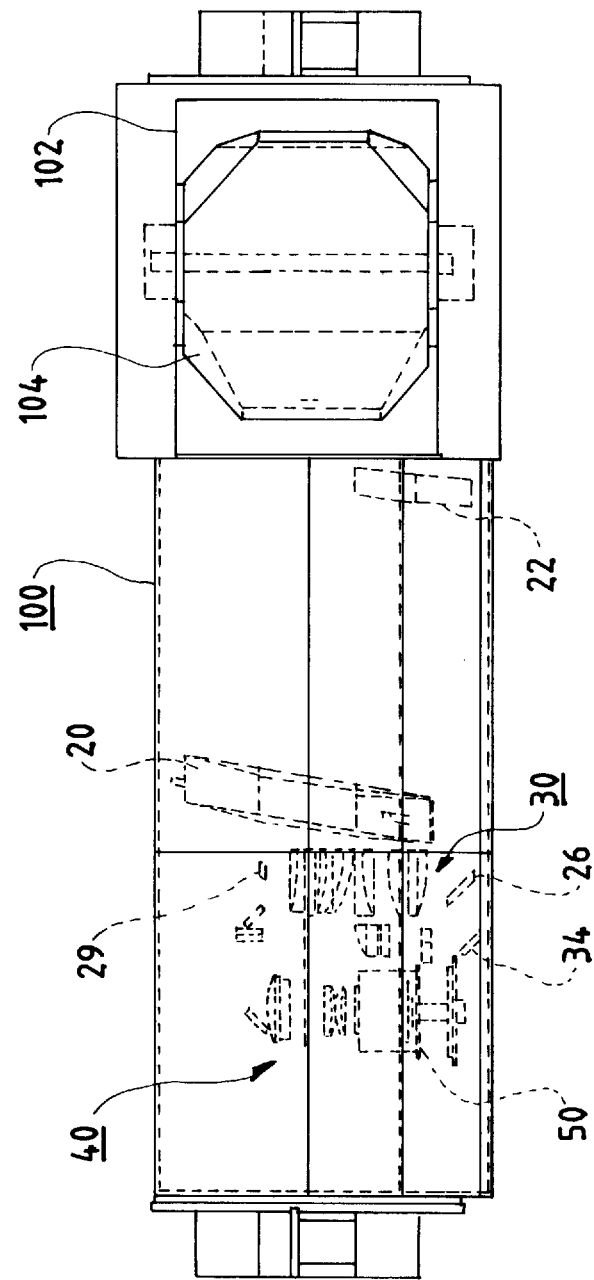
FIG. 24 is an elevational view of a conventional aerial reconnaissance camera system incorporating the inventive optical system, showing the scan mirror which directs radiation onto the primary mirror.

Referring now to FIG. 24, the present optical system is shown installed in an aerial reconnaissance camera housing 100 in a side elevational view, with the optical elements shown in dashed lines. The optical system of FIG. 24 is shown isolated in FIGS. 27 and 28. The camera housing 100 includes a planar dual spectrum window 102 oriented toward the scene of interest. A rotating scan mirror 104 is placed inside the housing 100 directly behind the window 102 and relays imagery onto the optical primary mirror 20 in a well known manner. The support electronics for the detectors 29 and 50, cooling systems for the IR detector 50, and supporting structure for the optical elements is deleted from FIG. 24 for the purposes of clarity, but is known to those of ordinary skill in the aerial reconnaissance camera art.

The window 102 must have a large enough clear aperture to allow for the aperture of the lens, detector field of view, scan angle coverage, and forward motion compensation (FMC). In addition it must have acceptable wavefront quality over the lens clear aperture to avoid loss of optical performance. For in-flight dual spectrum operation, the window must be fabricated from a material which allows both spectra to be transmitted simultaneously, such as ZnSe, sapphire, or zinc sulphide.

Figure 25:
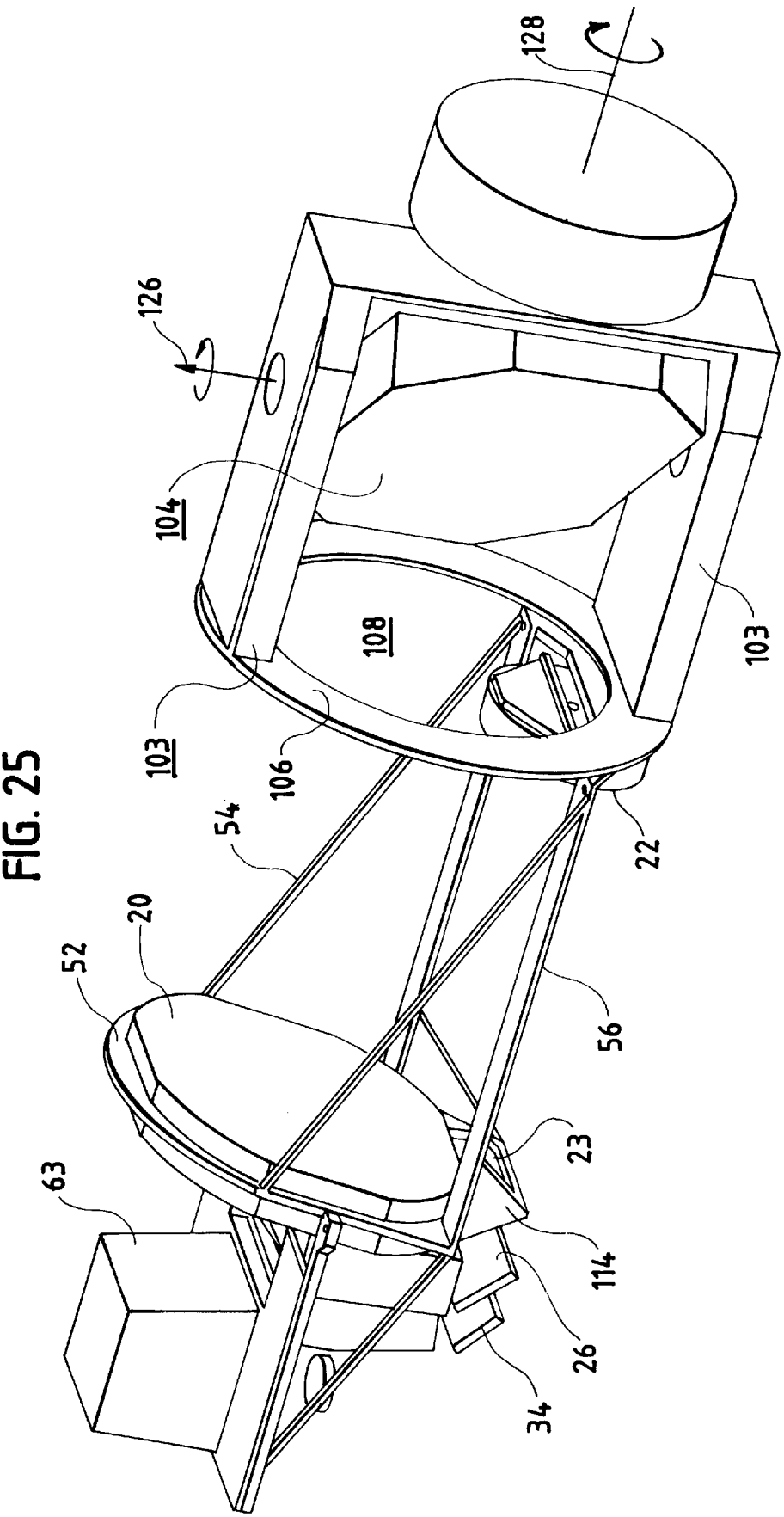
FIG. 25 and 26 are perspective views of the aerial reconnaissance camera assembly of FIG. 24.
Figure 26:
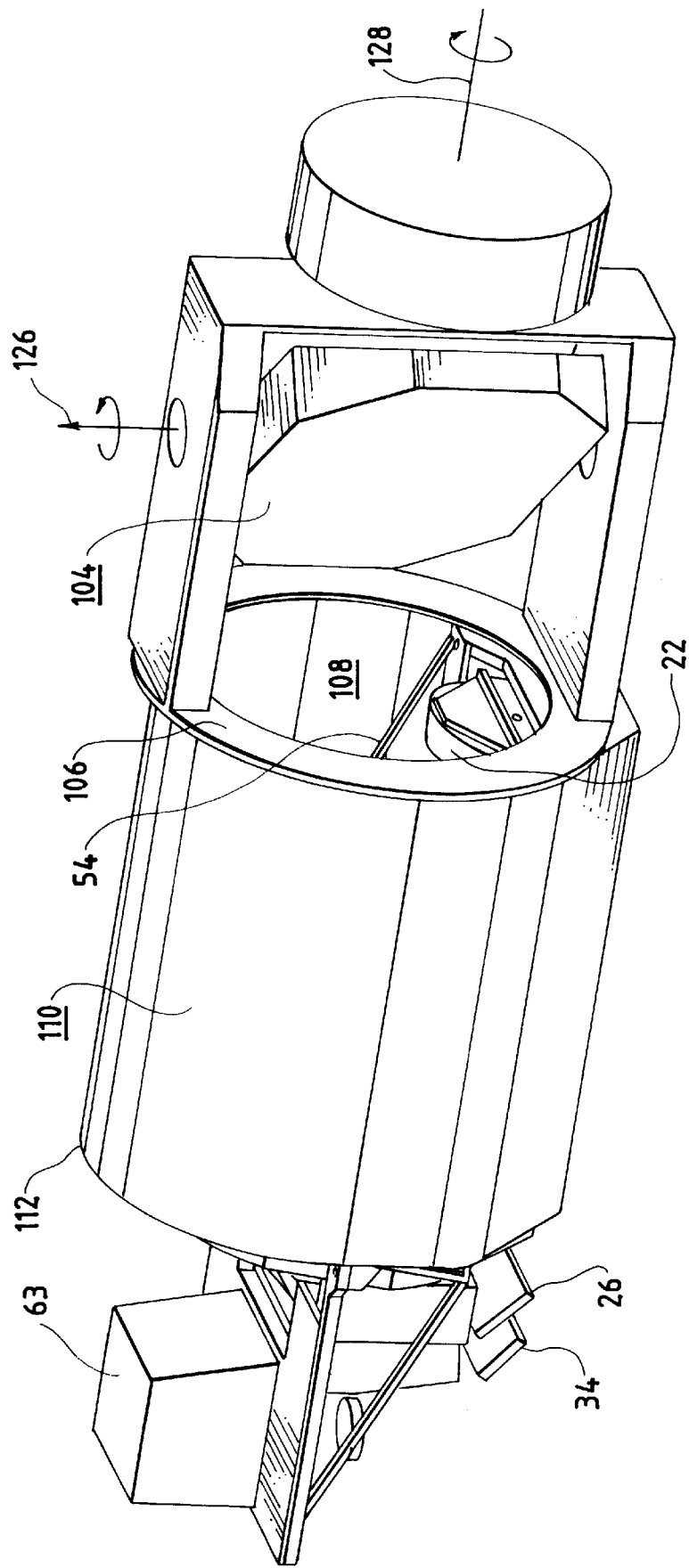

The aerial reconnaissance camera assembly of FIG. 24 is shown in a perspective view in FIG. 25, with the housing superstructure 100 removed. The bulkhead 103 abuts the window 102 of FIG. 24. A ring 106 limits the entrance aperture 108 of the primary lens 20. The field optics 30 for the visible path are enclosed within housing structure 63. FIG. 26 shows the camera assembly with a central tube 110 preventing stray light from entering the region between the primary 20 and the secondary 22 and proceeding to the detectors. The tube 110 holds the structure together. The end 112 of the tube 110 fits around the support ring 52 and lower portion 114 defining opening 23 (see FIG. 5). Additional light blocking baffles and mountings for the various components of the optical system of FIG. 25 and 26 are considered conventional and within the capabilities of persons of skill in the art, and are omitted for the sake of clarity.

The scan mirror 104 provides for fore and aft pointing when driven about axis 126. During operation, the scene is scanned by rotating the camera about the roll axis 128. A typical scan starts from a depression angle just below the horizon and proceeds between 10 and 20 degrees downward before returning to its original position for the start of the next scan. The direction of scan is at right angles to the Z axis of the primary mirror (see FIG. 5), which is parallel to axis 128. The scan mirror 104 may also provide yaw stabilization correction by means of a rate integrating gyroscope coupled with accelerometers which provide for active image stabilization. Similarly, roll axis stabilization is accomplished about axis 128. The scan mirror 104 may also be used to achieve Forward Motion Compensation (FMC) in a well known fashion to counter image motion due to forward motion of the aircraft during the scan.

Unlike conventional LOROP cameras which may be designed for film and/or E-O operation in the visible spectrum, the camera system of FIG. 24A–FIG. 26 is intended to operate in the MWIR region from 3 to 5 microns as well as in the visible E-O region from 0.55 to 0.90 microns. The E-O region is imaged by a linear E-O detector 29 that is part of a visible channel image sensor unit (ISU). The ISU contains the conventional support electronics for the E-O detector 29. The MWIR region is imaged by an infrared detector 50 that is installed in a suitable cooled housing or dewar. The infrared detector 50 is supported by a conventional IR electronics module (not shown).

The field group of lenses 30 shown in the visible channel are designed to work only in the E-O spectrum (about 0.55 to 0.90 microns). A second set of field optics 40 are required for the MWIR spectrum. The IR transmitting beamsplitter 26 allows IR energy to reflect off a mirror 34 and proceed through the MWIR field optics 40 after which it is relayed via relay lens to the dewar 62 (FIG. 7). In this embodiment of the invention, the field lens 40D (see FIGS. 27 and 28) is located between the fold mirrors whereas in FIG. 7 it is located just before the 2 fold mirrors. The relay lens serves to image the entrance pupil onto the cold stop to avoid the effects of reimaging of "warm" optical surfaces within the detector 50.

Figure 27:
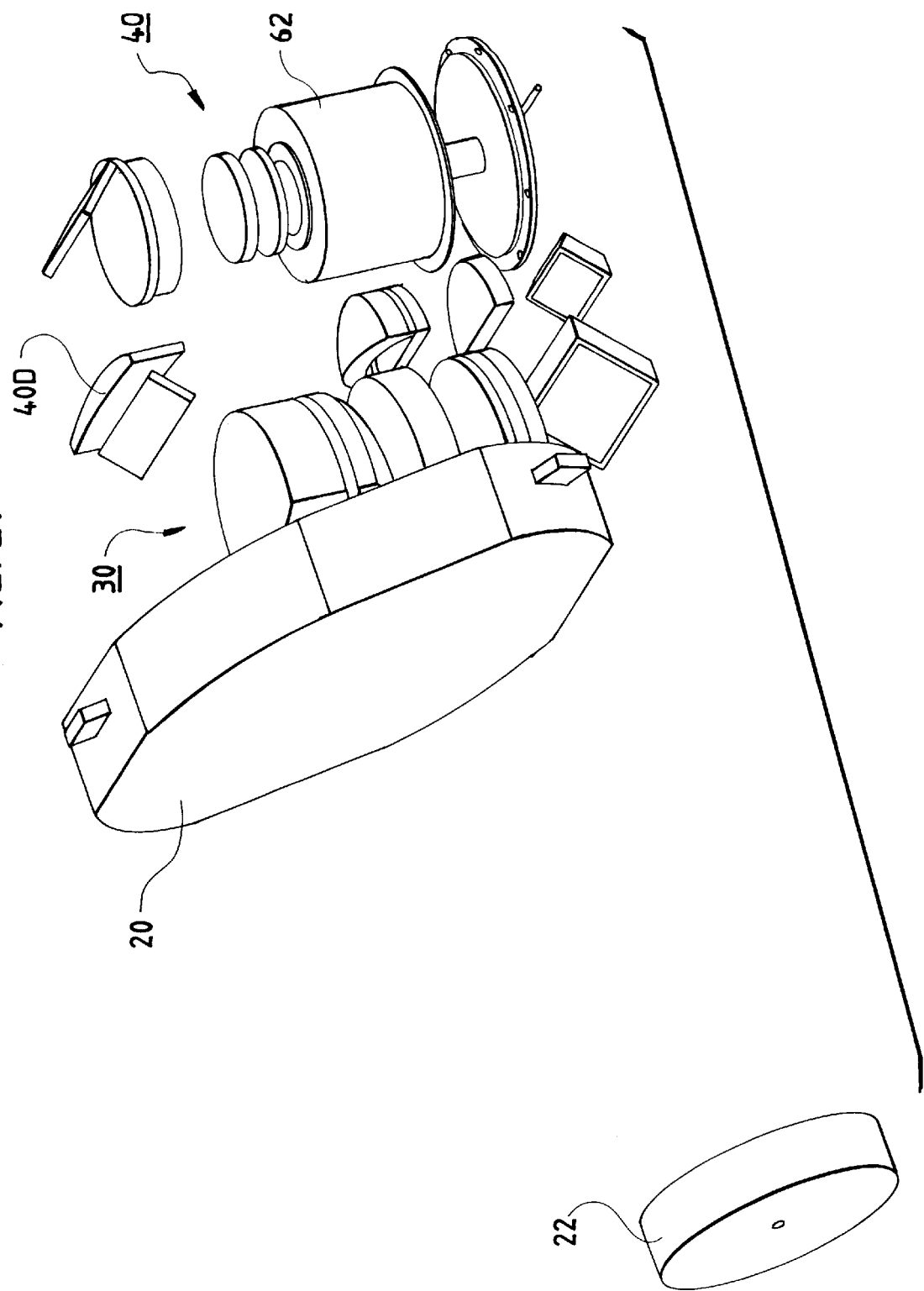
FIG. 27 is a perspective of another alternative embodiment of the optical system of FIG. 5.
Figure 28:
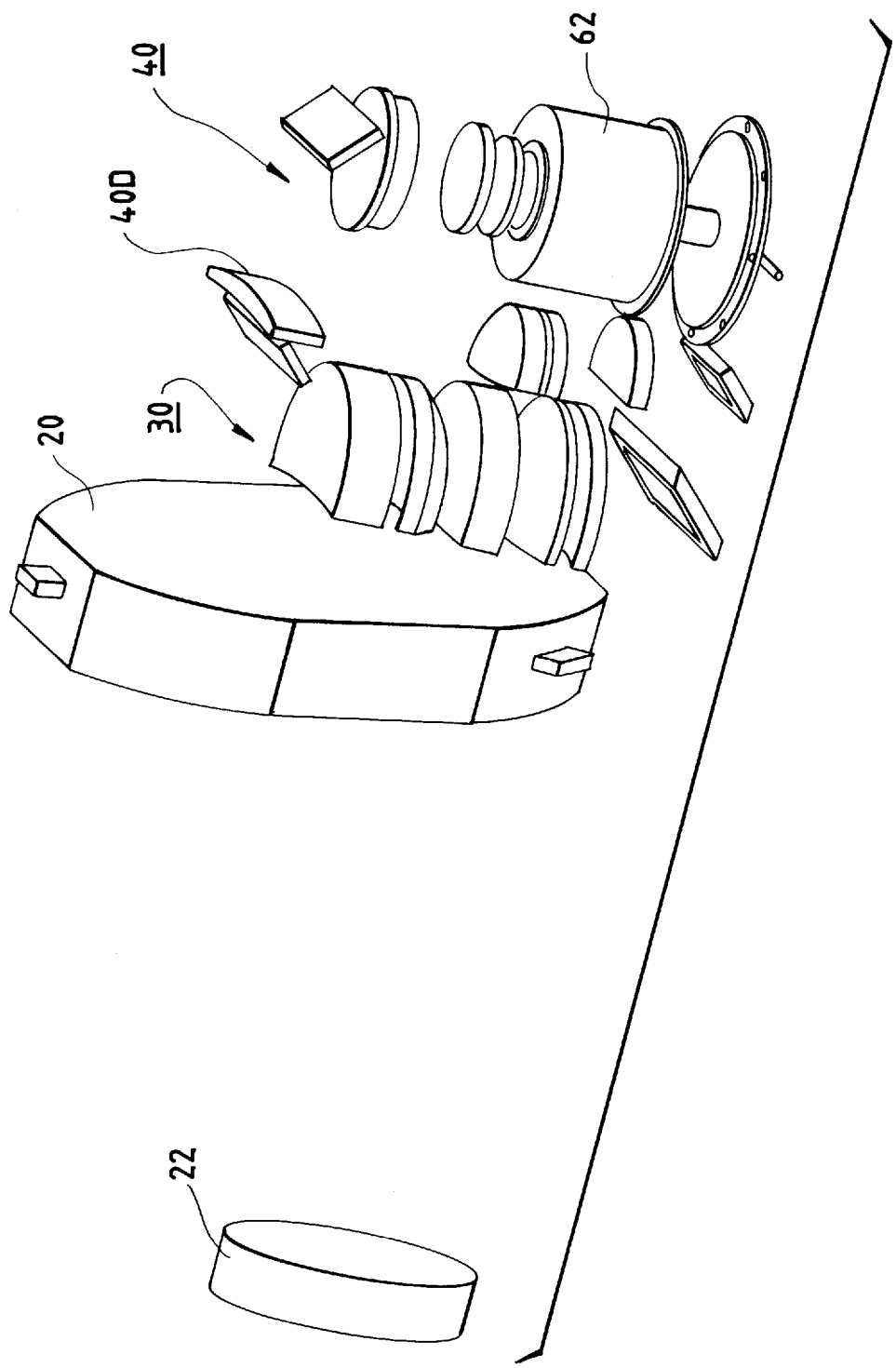
FIG. 28 is another perspective view of the embodiment of FIG. 27.

In the embodiment of FIG. 10 and 11, the visible E-O field optics are shown in full round configuration to facilitate manufacture, whereas truncated half lenses are shown for the visible field optics 30 and in a portion of the MWIR field optics 40 in the embodiments of FIG. 7 and 27–28. The selection of truncated half lenses is primarily for saving space. Since the entrance aperture is decentered, only a portion of the full round optical elements image the useful portion of the ray bundle. Other embodiments may be constructed where the visible and/or IR field optics are tilted at compound angles to facilitate compact packaging or maintain a full round configuration for the field optics.

Similarly, design modifications including other tilts and decenters may be added to facilitate alighment or manufacturability of the lenses, and such design modifications are considered within the scope of the present invention.

OPTICAL SYSTEM ADVANTAGES

The optical advantages of the present inventive design over a conventional Cassegrain design are at least five-fold.

1. The central obscuration normally found in prior art Cassegrain systems previously proposed is required to be relatively large when the field of view is large. In some prior art systems, the obscuration required is approximately 60% of the diameter of the primary mirror. This large of an obscuration in the center of the lens aperture leads to depressed MTF in the midrange spatial frequencies where performance is most needed in an E-O application. The camera system according to the present invention, on the other hand, uses an obscuration which is at the edge of the aperture (or, alternatively none at all) and does not depress the central MTF. FIGS. 14 and 21 shows the region obscured by the secondary mirror. The relative area lost by this aperture occupies only 10% to 15% of the lens aperture.

2. Reduced light loss due to a small obscuration coupled with high transmittance and maximum utilization of useful aperture diameter within the pod envelope (f/5 relative aperture) improves overall collection efficiency by at least one stop over prior art systems. This results in the need for less time-delay and integration (TDI) for a TDI charge-coupled device visible spectrum E-O detector and greater effectiveness in the IR.

3. The use of a decentered secondary mirror 22 minimizes the problems associated with baffling since there are very few direct paths for stray light to take. The necessary baffling can be accomplished by placing apertures at a few strategic locations.

4. The inventive optical design having an amplifying power of 4 (focal length divided by lens length) is shorter than most other prior art designs which have adequate baffling. This helps with packaging and space constraints present in reconnaissance camera pods.

5. Distortion of the present inventive system (see Table 3 for one representative embodiment) is low, implying that this system is suitable for mapping applications as well as visible/IR sensor fusion.

Overall, the present inventive system will provide optimum operational performance which can be achieved for a dual spectrum sensor within the mechanical envelope that is typically for LOROP photographic systems available.

While presently preferred embodiments of the invention have been described in detail herein, persons of skill in the art will appreciate that considerable variation may be made from the specifics described above without departure from the true scope and spirit of the invention. For example, as noted above the prescription for the field optics can vary as desired depending on the frequency bands of interest, the size and type of image receiving device, space constraints, etc. The optical system may be employed in a variety of applications besides aerial reconnaissance cameras, especially where long focal length and wide field of view are needed over a wide range of frequencies. Additionally, a third set of field optics and third detector could be used to separate image a third portion of the spectrum, instead of the two detectors of FIG. 5.

Further, the relative decentering of the primary and secondary mirrors relative to the system aperture may vary from slightly off center to completely decentered, depending on the optical performance required by the system and the need for reduced obscuration, and after considering stray light and baffling issues.

Additionally, the radiation receiving devices can be linear detectors (film or electro-optic), or limited area array devices such as that described in the Lareau et al. U.S. Pat. No. 5,155,597, assigned to the assignee of the present invention. If area array detectors are chosen, it may require adjustment of the location of the primary and secondary mirrors relative to each other and the field optics, design issues that are considered within the scope of the invention and within the level of skill in the art based on the present disclosure.

Other design changes for spectroscopy, and spectroradiography applications may require the inclusion of monochrometers in each optical path, different field optics and perhaps spectral filters in each path. In remote sensing or mine detection applications, adjustments to the amount of decentering of the aperture, the relative position of the primary and secondary mirrors and the field optics may be necessary to optimize the design for these particular applications, again without departure from the spirit and scope of the invention.

This true scope and spirit of the invention is defined by the appended claims, to be interpreted in light of the foregoing.

I claim:

1. A dual spectrum terrestrial aerial reconnaissance camera optical system, comprising:
   a) a first detector means for imaging a scene from radiation in a first broad portion of the electromagnetic spectrum;
   b) a second detector means for imaging said scene from radiation in a second broad portion of the electromagnetic spectrum;
   c) a multi-spectral decentered aperture catadioptric optical system comprising a primary mirror and a secondary mirror for directing radiation from said scene onto said first detector means and second detector means, said optical system having a single entrance aperture for said radiation in said first and second broad portions of the electromagnetic spectrum for imaging by said first and second detector means and an optical axis, wherein said entrance aperture is displaced relative to said optical axis, said optical system further comprising:
      1) a means for separation of said radiation into first and second optical paths,
      2) a first field optical assembly in said first optical path for directing radiation in said first broad portion of said spectrum onto said first detector means, and
      3) a second field optical assembly for directing said radiation from said scene in said second broad portion of said spectrum onto said second detector means;
   d) wherein radiation impinging on said first and second detectors passes through said single entrance aperture and wherein said primary and secondary mirrors and said first and second field optical assemblies are constructed so as to permit high resolution images to be generated from said first and second detectors in respective first and second broad portions of the electromagnetic spectrum from said radiation.

2. The aerial reconnaissance camera optical system of claim 1, wherein said first detector means comprises an electro-optical detector.

3. The aerial reconnaissance camera optical system of claim 1, wherein said first detector means comprises a film camera.

4. The aerial reconnaissance camera optical system of claim 2, wherein said electro-optical detector comprises a charge-coupled device.

5. The aerial reconnaissance camera optical system of claim 2, wherein said second detector means comprises a charge-coupled device.

6. The aerial reconnaissance camera optical system of claim 4 wherein said charge coupled device comprises a linear charge coupled device.

7. The aerial reconnaissance camera optical system of claim 5, wherein said charge-coupled device comprises a linear charge coupled device.

8. The aerial reconnaissance camera optical system of claim 4, wherein said charge coupled device comprises an area array charge coupled device.

9. The aerial reconnaissance camera optical system of claim 5 wherein said charge coupled device comprises an area array charge coupled device.

10. A dual spectrum terrestrial aerial reconnaissance camera optical system, comprising:
   a) a first detector means for imaging a scene from radiation in a first broad portion of the electromagnetic spectrum;
   b) a second detector means for imaging said scene from radiation in a second broad portion of the electromagnetic spectrum;
   c) a multi-spectral decentered aperture catadioptric optical system comprising a primary mirror and a secondary mirror for directing radiation from said scene onto said first detector means and second detector means, said optical system having a single entrance aperture for said radiation in said first and second broad portions of the electromagnetic spectrum for imaging by said first and second detector means and an optical axis, wherein said entrance aperture is displaced relative to said optical axis, said optical system further comprising:
      1) a means for separation of said radiation into first and second optical paths,
      2) a first field optical assembly in said first optical path for directing radiation in said first broad portion of said spectrum onto said first detector means, and
      3) a second field optical assembly for directing said radiation from said scene in said second broad portion of said spectrum onto said second detector means;
   wherein said first portion of the spectrum comprises the portion of the electromagnetic spectrum between about 200 nm and about 900 nmn.

11. The aerial reconnaissance camera optical system of claim 10, wherein said first portion of the spectrum comprises the portion of the spectrum between about 450 and about 900 nm.

12. The aerial reconnaissance camera optical system of claim 10, wherein said second portion of the spectrum comprises the portion of the spectrum between about 3 microns and about 14 microns.

13. The aerial reconnaissance camera optical system of claim 12, wherein said second portion of the spectrum comprises the portion of the spectrum between about 3 microns and about 5 microns.

14. The aerial reconnaissance camera optical system of claim 12, wherein said second portion of the spectrum comprises the portion of the spectrum between about 8 microns and about 14 microns.

15. The aerial reconnaissance camera optical system of claim 1, wherein said primary mirror and said secondary mirror comprise aspheric optical elements.

16. The aerial reconnaissance camera optical system of claim 15, wherein said secondary mirror comprises a conic hyperbola optical element.

17. A multi-spectral decentered aperture catadioptric optical system, comprising:
   a primary mirror receiving incident radiation and defining a central aperture;
   a secondary mirror receiving said radiation from said primary mirror, said secondary mirror directing said radiation onto a means for splitting said radiation into a least a first image forming optical path and a second image forming optical path;
   said optical system having a single entrance aperture and an optical axis, wherein said entrance aperture is displaced relative to the optical axis;
   a first field optical assembly in said first optical path for directing radiation in a first broad portion of the electromagnetic spectrum onto a first radiation receiving device;
   a second field optical assembly in said optical path for directing radiation in a second broad portion of the electromagnetic spectrum onto a second radiation receiving device;
   wherein radiation impinging on said first and second radiation receiving devices passes through said single entrance aperture and wherein said primary and secondary mirrors and said first and second field optical assemblies are constructed so as to permit high resolution images to be generated from said first and second radiation receiving devices in respective first and second broad portions of the electromagnetic spectrum from said incident radiation.

18. The optical system of claim 17, wherein said first and second radiation receiving devices comprise image recording devices.

19. The optical system of claim 18, wherein said image recording devices comprise electro-optical sensors.

20. The optical system of claim 17, wherein said primary mirror is bilaterally symmetrical about a first plane but not symmetrical about a second plane orthogonal to said first plane.

21. The optical system of claim 20, wherein said primary mirror has a first f/number along a first axis and a second f/number greater than said first f/number along said second axis, said second axis perpendicular to said first axis.

22. The optical system of claim 17, wherein said optical axis and a chief ray passing through said entrance aperture define a plane of displacement and wherein said first radiation receiving device comprises a linear detector having a long axis, and wherein said long axis is oriented perpendicular to said plane of displacement.

23. The optical system of claim 17, wherein said optical axis and a chief ray passing through said entrance aperture define a plane of displacement and wherein said first and second radiation receiving devices each comprise a linear sensor having a long axis, and wherein said long axis of said first and second sensors are oriented perpendicular to said plane of displacement.

24. The optical system of claim 17, wherein said first and second radiation receiving devices comprise astronomical imaging cameras.

25. A multi-spectral decentered optical system, said optical system defining a single entrance aperture, comprising:
   an aspheric primary mirror receiving incident radiation;
   an aspheric secondary mirror receiving said radiation from said primary mirror;

said optical system defining an optical axis, said entrance aperture of said optical system displaced from said optical axis so as to thereby increase the modulation transfer function of said optical system;

said aspheric secondary mirror directing said radiation onto a means for splitting said radiation into a first image forming optical path and a second image forming optical path;

a first field optical assembly in said first optical path directing radiation in a first portion of the electromagnetic spectrum onto a first radiation receiving device;

a second field optical assembly in said second optical path directing radiation in a second portion of the electromagnetic spectrum onto a second radiation receiving device;

said aspheric primary mirror, aspheric secondary mirror, first field optical assembly, second field optical assembly and means for splitting said radiation assembled in an aerial reconnaissance camera housing;

said first and second radiation receiving devices comprising charge coupled devices;

wherein radiation impinging on said charge coupled devices passes through said single entrance aperture and wherein said primary and secondary mirrors and said first and second field optical assemblies are constructed so as to permit high resolution images to be generated from said charge coupled devices in respective first and second broad portions of the electromagnetic spectrum from said incident radiation.

26. The optical system of claim 25, wherein said optical axis and a chief ray passing through said entrance aperture define a plane of displacement and wherein said linear charge coupled devices have a long axis, and wherein said long axis is oriented perpendicular to said plane of displacement.

27. A multi-spectral decentered optical system, said optical system defining a single entrance aperture, comprising:

an aspheric primary mirror receiving incident radiation;

an aspheric secondary mirror receiving said radiation from said primary mirror;

said optical system defining an optical axis, said entrance aperture of said optical system displaced from said optical axis so as to thereby increase the modulation transfer function of said optical system;

said aspheric secondary mirror directing said radiation onto a means for splitting said radiation into a first image forming optical path and a second image forming optical path;

a first field optical assembly in said first optical path directing radiation in a first portion of the electromagnetic spectrum onto a first radiation receiving device;

a second field optical assembly in said second optical path directing radiation in a second portion of the electromagnetic spectrum onto a second radiation receiving device;

said aspheric primary mirror, aspheric secondary mirror, first field optical assembly, second field optical assembly and means for splitting said radiation assembled in an aerial reconnaissance camera housing;

said first and second radiation receiving devices comprising charge coupled devices;

wherein said first and second portion of the spectrum imaged by said charge coupled devices comprise the ultraviolet and visible portions of the spectrum, respectively.

28. A multi-spectral decentered optical system, said optical system defining a single entrance aperture, comprising:

an aspheric primary mirror receiving incident radiation;

an aspheric secondary mirror receiving said radiation from said primary mirror;

said optical system defining an optical axis, said entrance aperture of said optical system displaced from said optical axis so as to thereby increase the modulation transfer function of said optical system;

said aspheric secondary mirror directing said radiation onto a means for splitting said radiation into a first image forming optical path and a second image forming optical path;

a first field optical assembly in said first optical path directing radiation in a first portion of the electromagnetic spectrum onto a first radiation receiving device;

a second field optical assembly in said second optical path directing radiation in a second portion of the electromagnetic spectrum onto a second radiation receiving device;

said aspheric primary mirror, aspheric secondary mirror, first field optical assembly, second field optical assembly and means for splitting assembled in an aerial reconnaissance camera housing;

said first and second radiation receiving devices comprising charge coupled devices;

wherein said first and second portion of the spectrum imaged by said charge coupled devices comprise the visible and infrared portions of the spectrum, respectively.

29. A multi-spectral decentered optical system, said optical system defining a single entrance aperture, comprising:

an aspheric primary mirror receiving incident radiation;

an aspheric secondary mirror receiving said radiation from said primary mirror;

said optical system defining an optical axis, said entrance aperture of said optical system displaced from said optical axis so as to thereby increase the modulation transfer function of said optical system;

said aspheric secondary mirror directing said radiation onto a means for splitting said radiation into a first image forming optical path and a second image forming optical path;

a first field optical assembly in said first optical path directing radiation in a first portion of the electromagnetic spectrum onto a first radiation receiving device;

a second field optical assembly in said second optical path directing radiation in a second portion of the electromagnetic spectrum onto a second radiation receiving device;

said aspheric primary mirror, aspheric secondary mirror, first field optical assembly, second field optical assembly and means for splitting said radiation assembled in an aerial reconnaissance camera housing;

said first and second radiation receiving devices comprising charge coupled devices;

wherein said first and second portions of the spectrum imaged by said charge coupled devices comprise the ultraviolet and infrared portions of the spectrum, respectively.

30. A multi-spectral decentered aperture catadioptric optical system, said optical system having a single entrance aperture, comprising:

an aspheric primary mirror receiving incident radiation;

an aspheric secondary mirror receiving said radiation from said primary mirror;

said optical system defining an optical axis, said entrance aperture of said optical system displaced from said optical axis so as to thereby increase the modulation transfer function of said optical system;

said aspheric secondary mirror directing said radiation onto a means for splitting said radiation into a first image forming optical path and a second image forming optical path;

a first field optical assembly in said first optical path directing radiation in a first broad portion of the electromagnetic spectrum onto a first radiation receiving device;

a second field optical assembly in said second optical path directing radiation in a second broad portion of the electromagnetic spectrum onto a second radiation receiving device;

wherein radiation impinging on said radiation receiving devices passes through said single entrance aperture and wherein the optical design of said primary and secondary mirrors and said first and second field optical assemblies is optimized in a decentered configuration so as to produce a non-circular field of view for said first and second radiation receiving devices, said non-circular field of view having a magnitude in one direction substantially greater than a magnitude in an orthogonal direction.

31. The multi-spectral decentered catadioptric optical system of claim 30, wherein said first and second radiation receiving devices comprise linear charge-coupled devices.

32. The multi-spectral decentered catadioptric optical system of claim 30, wherein said first broad portion of the electromagnetic spectrum comprises the visible portion of the spectrum.

33. The multi-spectral decentered catadioptric optical system of claim 30, wherein said first broad portion of the electromagnetic spectrum comprises the infrared portion of the spectrum.

34. The multi-spectral decentered catadioptric optical system of claim 30, wherein at least one of said radiation receiving devices comprises a area array of limited width.

35. A multi-spectral decentered aperture catadioptric optical system, said optical system having a single entrance aperture, comprising:

an aspheric primary mirror receiving incident radiation;

an aspheric secondary mirror receiving said radiation from said primary mirror;

said optical system defining an optical axis, said entrance aperture of said optical system displaced from said optical axis so as to thereby increase the modulation transfer function of said optical system;

said aspheric secondary mirror directing said radiation into at least one image forming path;

a field optical assembly in said image forming path directing radiation in a broad portion of the electromagnetic spectrum onto at least one radiation receiving device forming an image from said radiation; said at least one radiation receiving device imaging in two broad portions of the electromagnetic spectrum;

wherein radiation impinging on said at least one radiation receiving device passes through said single entrance aperture and wherein said primary and secondary mirrors and said field optical assembly are constructed so as to permit high resolution images to be generated from radiation receiving device;

wherein said broad portion of the electromagnetic spectrum comprises the portion of the spectrum between 200 nm and 14 microns.

36. The system of claim 35, further comprises a second radiation device and a set of second field optical assemblies in a second optical path and wherein said first radiation receiving device images in a first portion of said broad portion of said electromagnetic spectrum and said second radiation receiving device images in a second portion of said broad portion of said electromagnetic spectrum.

37. The system of claim 35, wherein said first portion comprises the a first portion of the infrared spectrum below 14 microns and said second portion comprises a second portion of the infra-red spectrum below 14 microns.

* * * * *